US008401996B2

(12) United States Patent
Muller et al.

(10) Patent No.: US 8,401,996 B2
(45) Date of Patent: Mar. 19, 2013

(54) STORING A VARIABLE NUMBER OF INSTANCES OF DATA OBJECTS

(75) Inventors: Marcus S. Muller, Tinton Falls, NJ (US); Deepak R. Attarde, Ocean, NJ (US); Manoj Kumar Vijayan, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 492 days.

(21) Appl. No.: 12/649,454

(22) Filed: Dec. 30, 2009

(65) Prior Publication Data

US 2010/0250549 A1    Sep. 30, 2010

Related U.S. Application Data

(60) Provisional application No. 61/164,803, filed on Mar. 30, 2009.

(51) Int. Cl.
*G06F 17/00* (2006.01)
(52) U.S. Cl. .......................... 707/651; 707/652; 707/653
(58) Field of Classification Search ................. 707/644, 707/645, 647, 651–653, 655, 659, 660
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |

(Continued)

FOREIGN PATENT DOCUMENTS

| EP | 0259912 A1 | 3/1988 |
|---|---|---|
| EP | 0405926 A2 | 1/1991 |

(Continued)

OTHER PUBLICATIONS

U.S. Appl. No. 12/647,906, filed Dec. 28, 2009, Attarde et al.

(Continued)

*Primary Examiner* — James E Richardson
(74) *Attorney, Agent, or Firm* — Perkins Coie LLP

(57) ABSTRACT

Described are systems and methods for storing a variable number of instances of data objects (e.g., 1, 2, 3, or up to N−1 instances, where N is the number of instances of the data object included in primary data) in secondary storage across a data storage network. In some examples, a system for storing a variable number of instances of data objects includes, one or more computing devices storing a set of data objects and multiple storage devices distinct from the one or more computing devices. Each of the multiple storage devices is configured to store at least a single instance of a data object. The system also includes a database configured to store information associated with the data objects. This information includes substantially unique identifiers for the data objects and, for each of the data objects, a number of instances of the data object stored on the multiple storage devices.

18 Claims, 10 Drawing Sheets

U.S. PATENT DOCUMENTS

| | | |
|---|---|---|
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,822,780 A | 10/1998 | Schutzman |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,125,369 A | 9/2000 | Wu et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 | 11/2001 | Alam et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,513,051 B1 | 1/2003 | Bolosky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,157 B2 | 8/2003 | Deo et al. |
| 6,609,183 B2 | 8/2003 | Ohran |
| 6,609,187 B1 | 8/2003 | Merrell et al. |
| 6,658,526 B2 | 12/2003 | Nguyen et al. |
| 6,704,730 B2 | 3/2004 | Moulton et al. |
| 6,745,304 B2 | 6/2004 | Playe |
| 6,757,699 B2 | 6/2004 | Lowry |
| 6,757,794 B2 | 6/2004 | Cabrera et al. |
| 6,795,903 B2 | 9/2004 | Schultz et al. |
| 6,810,398 B2 | 10/2004 | Moulton |
| 6,865,655 B1 | 3/2005 | Andersen |
| 6,868,417 B2 | 3/2005 | Kazar et al. |
| 6,901,493 B1 | 5/2005 | Maffezzoni |
| 6,928,459 B1 | 8/2005 | Sawdon et al. |
| 6,952,758 B2 | 10/2005 | Chron et al. |
| 6,959,368 B1 | 10/2005 | St. Pierre et al. |
| 6,976,039 B2 | 12/2005 | Chefalas et al. |
| 6,993,162 B2 | 1/2006 | Stephany et al. |
| 7,017,113 B2 | 3/2006 | Bourbakis et al. |
| 7,035,943 B2 | 4/2006 | Yamane et al. |
| 7,085,904 B2 | 8/2006 | Mizuno et al. |
| 7,089,395 B2 | 8/2006 | Jacobson et al. |
| 7,111,173 B1 | 9/2006 | Scheidt |
| 7,117,246 B2 | 10/2006 | Christenson et al. |
| 7,143,091 B2 | 11/2006 | Charnock et al. |
| 7,191,290 B1 | 3/2007 | Ackaouy et al. |
| 7,200,604 B2 | 4/2007 | Forman et al. |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,320,059 B1 | 1/2008 | Armangau et al. |
| 7,325,110 B2 | 1/2008 | Kubo et al. |
| 7,330,997 B1 * | 2/2008 | Odom .................. 714/6.23 |
| 7,383,462 B2 | 6/2008 | Osaki et al. |
| 7,395,282 B1 | 7/2008 | Crescenti et al. |
| 7,444,382 B2 | 10/2008 | Malik |
| 7,444,387 B2 | 10/2008 | Douceur et al. |
| 7,478,113 B1 | 1/2009 | De Spiegeleer et al. |
| 7,487,245 B2 | 2/2009 | Douceur et al. |
| 7,490,207 B2 | 2/2009 | Amarendran et al. |
| 7,496,604 B2 | 2/2009 | Sutton, Jr. et al. |
| 7,519,726 B2 | 4/2009 | Palliyil et al. |
| 7,613,748 B2 | 11/2009 | Brockway et al. |
| 7,631,194 B2 | 12/2009 | Wahlert et al. |
| 7,647,462 B2 | 1/2010 | Wolfgang et al. |
| 7,661,028 B2 | 2/2010 | Erofeev |
| 7,676,590 B2 | 3/2010 | Silverman et al. |
| 7,685,177 B1 | 3/2010 | Hagerstrom et al. |
| 7,685,459 B1 | 3/2010 | De Spiegeleer et al. |
| 7,698,699 B2 | 4/2010 | Rogers et al. |
| 7,814,142 B2 | 10/2010 | Mamou et al. |
| 7,818,287 B2 | 10/2010 | Torii et al. |
| 7,870,486 B2 | 1/2011 | Wang et al. |
| 8,054,765 B2 * | 11/2011 | Passey et al. .................. 370/256 |
| 2002/0055972 A1 * | 5/2002 | Weinman, Jr. ................. 709/203 |
| 2002/0099806 A1 | 7/2002 | Balsamo et al. |
| 2002/0107877 A1 | 8/2002 | Whiting et al. |
| 2003/0033308 A1 | 2/2003 | Patel et al. |
| 2003/0110190 A1 | 6/2003 | Achiwa et al. |
| 2003/0167318 A1 | 9/2003 | Robbin et al. |
| 2004/0148306 A1 | 7/2004 | Moulton et al. |
| 2004/0230817 A1 | 11/2004 | Ma |
| 2004/0250033 A1 | 12/2004 | Prahlad et al. |
| 2005/0033756 A1 | 2/2005 | Kottomtharayil et al. |
| 2005/0066190 A1 | 3/2005 | Martin |
| 2005/0203864 A1 | 9/2005 | Schmidt et al. |
| 2005/0234823 A1 | 10/2005 | Schimpf |
| 2006/0010227 A1 | 1/2006 | Atluri |
| 2006/0047894 A1 | 3/2006 | Okumura |
| 2006/0053262 A1 * | 3/2006 | Prahlad et al. ................. 711/162 |
| 2006/0056623 A1 | 3/2006 | Gligor et al. |
| 2006/0095470 A1 * | 5/2006 | Cochran et al. ............ 707/104.1 |
| 2006/0136761 A1 * | 6/2006 | Frasier et al. .................. 713/320 |
| 2006/0174112 A1 | 8/2006 | Wray |
| 2006/0224846 A1 | 10/2006 | Amarendran et al. |
| 2007/0022145 A1 | 1/2007 | Kavuri |
| 2007/0118705 A1 | 5/2007 | Arakawa et al. |
| 2007/0136200 A1 * | 6/2007 | Frank et al. ...................... 705/50 |
| 2007/0179995 A1 | 8/2007 | Prahlad et al. |
| 2007/0198613 A1 | 8/2007 | Prahlad et al. |
| 2007/0203937 A1 | 8/2007 | Prahlad et al. |
| 2007/0255758 A1 | 11/2007 | Zheng et al. |
| 2007/0271316 A1 * | 11/2007 | Hollebeek ...................... 707/204 |
| 2008/0028007 A1 | 1/2008 | Ishii et al. |
| 2008/0098083 A1 | 4/2008 | Shergill et al. |
| 2008/0162320 A1 | 7/2008 | Mueller et al. |
| 2008/0162518 A1 | 7/2008 | Bollinger et al. |
| 2008/0177807 A1 * | 7/2008 | Dile et al. ...................... 707/204 |
| 2008/0229037 A1 | 9/2008 | Bunte et al. |

| | | |
|---|---|---|
| 2008/0243879 A1 | 10/2008 | Gokhale et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2009/0063528 A1 | 3/2009 | Yueh |
| 2009/0106480 A1 | 4/2009 | Chung |
| 2009/0112870 A1 | 4/2009 | Ozzie et al. |
| 2009/0132619 A1 | 5/2009 | Arakawa et al. |
| 2009/0144285 A1 | 6/2009 | Chatley et al. |
| 2009/0177719 A1 | 7/2009 | Kavuri |
| 2009/0192978 A1 | 7/2009 | Hewett et al. |
| 2009/0204649 A1 | 8/2009 | Wong et al. |
| 2009/0319534 A1 | 12/2009 | Gokhale |
| 2009/0319585 A1 | 12/2009 | Gokhale |
| 2010/0005259 A1 | 1/2010 | Prahlad et al. |
| 2010/0082672 A1 | 4/2010 | Kottomtharayil et al. |
| 2010/0094817 A1 | 4/2010 | Ben-Shaul et al. |
| 2010/0161554 A1 | 6/2010 | Datuashvili et al. |
| 2010/0169287 A1 | 7/2010 | Klose |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988- Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Commvault Systems, Inc., "Continuous Data Replicator 7.0," Product Data Sheet, 2007.

Diligent Technologies "HyperFactor," <http://www.diligent.com/products:protecTIER-1:HyperFactor-1>, Internet accessed on Dec. 5, 2008, 2 pages.

Eitel, "Backup and Storage Management in Distributed Heterogeneous Environments," *IEEE*, 1994, pp. 124-126.

International Search Report and Written Opinion, International Application No. PCT/US2009/58137, Mail Date Dec. 23, 2009, 14 pages.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Kornblum, Jesse, "Identifying Almost Identical Files Using Context Triggered Piecewise Hashing," www.sciencedirect.com, Digital Investigation 3S (2006), pp. S91-S97.

Lortu Software Development, "Kondar Technology-Deduplication," <http://www.lortu.com/en/deduplication.asp>, Internet accessed on Dec. 5, 2008, 3 pages.

Overland Storage, "Data Deduplication," <http://www.overlandstorage.com/topics/data_deduplication.html>, Internet accessed on Dec. 5, 2008, 2 pages.

Quantum Corporation, "Data De-Duplication Background: A Technical White Paper," May 2008, 13 pages.

Rosenblum et al., "The Design and Implementation of a Log-Structured File System," *Operating Systems Review SIGOPS*, vol. 25, No. 5, New York, US, pp. 1-15 (May 1991).

U.S. Appl. No. 13/251,022, filed Sep. 30, 2011, Gokhale.

Federal Information Processing Standards Publication 180-2, "Secure Hash Standard", Aug. 1, 2002, <http://csrc.nist.gov/publications/fips/fips1 80-2/fips 1 80-2withchangenotice.pdf>, 83 pages.

Menezes et al., "Handbook of Applied Cryptography", CRC Press, 1996, <http://www.cacr.math.uwaterloo.ca/hac/aboutlchap9.pdf>, 64 pages.

Microsoft, "Computer Dictionary", Fifth Edition, 2002, 3 pages.

SearchStorage, "File System", Nov. 1998, <http://searchstorage.techtarget.com/definition/file-system>, 10 pages.

Webopedia, "Data Duplication", Aug. 31, 2006, <http://web.archive.org/web/20060913030559/http://www.webopedia.com/TERMID/data_deduplication.html>, 2 pages.

CommVault Systems, Inc., "Deduplication," <http://documentation.commvault.com/commvault/release_8_0_0/books_online_1/english_US/features/single_instance/single_instance.htm>, internet accessed on May 21, 2009, 9 pages.

CommVault Systems, Inc., "Deduplication—How to," <http://documentation.commvault.com/commvault/release_8_0_0/books_online_1/english_US/features/single_instance/single_instance_how_to.htm>, internet accessed on May 21, 2009, 7 pages.

* cited by examiner

DataObjects 700

| Name of data object | Substantially unique identifier | Number of Instances should be Stored | Number of Instances Stored | Reference Count | Size | Time |
|---|---|---|---|---|---|---|
| inetcom.dll | 0xA1B3FG | 2 | 2 | 38 | 258 | 11/1/08 |
| Figures.pdf | 0xFG329A | 1 | 1 | 1 | 1,248 | 11/27/08 |
| Q408.xls | 0x182FA34 | 4 | 0 | 0 | 8,301 | 11/1/508 |
| ... | | | | | | |

702, 704, 706, 708, 710, 712, 714

716 — inetcom.dll row
718 — Figures.pdf row
720 — Q408.xls row

DataObjectsLocations 740

| Substantially unique identifier | Location identifier |
|---|---|
| 0xA1B3FG | 00935 |
| 0xA1B3FG | 00121 |
| 0xFG329A | 00478 |
| ... | |

742, 744
746, 748, 750

Locations 760

| Location identifier | Substantially unique identifier |
|---|---|
| 00935 | Storage Device 1 |
| 00121 | Storage Device 2 |
| 00478 | Storage Device 3 |
| 00382 | Storage Device 4 |
| 02097 | Storage Device 5 |
| ... | |

ABLE NUMBER OF
STORING A VARIABLE NUMBER OF INSTANCES OF DATA OBJECTS

CROSS REFERENCE TO RELATED APPLICATION

This application claims the benefit of U.S. Patent Application No. 61/164,803 filed on Mar. 30, 2009 (entitled STORING A VARIABLE NUMBER OF INSTANCES OF DATA OBJECTS), which is incorporated by reference in its entirety.

BACKGROUND

An organization typically protects its data by making one or more copies of it. The data to be protected is typically termed primary data, which generally includes production data. The copies of the primary data are typically called secondary copies, tertiary copies, etc. Primary data may include numerous data objects. A data object is any collection or grouping of bytes of data that can be viewed as one or more logical units (data objects include, e.g., files, email messages, database entries, etc.). A data object may be unique (i.e., there is only one instance of the data object in the primary data) or non-unique (i.e., there is more than one instance of the data object in the primary data). Conventional data protection techniques typically involve making a secondary copy of each data object in the primary data, regardless of whether it is unique or not. For example, if the primary data includes N instances of a certain data object, conventional data protection techniques would result in creating a secondary copy that also includes N instances of the data object. Conventional data protection techniques thus minimize the risk of data loss of non-unique data objects (because another instance of a non-unique data object can likely be restored), at the expense of creating secondary copies that are as large as the primary data.

In contrast, single instance storage techniques typically provide for secondary storage of a single instance of a given data object included in primary data. Such single instance storage techniques typically operate by comparing signatures or hashes of data objects in primary data against signatures or hashes of data objects already stored in secondary storage. If a signature or hash of a data object matches that of a previously stored data object, then the data object is not stored, and only a pointer or other reference to the previously stored data object is stored in its place. Such single instance storage techniques result in creating a secondary copy of the primary data that includes only one single instance of each data object in the primary data.

While such single instance storage techniques may be efficient in terms of minimizing the storage space used to store data objects, they do result in some danger in terms of overall data protection. For example, if there is a problem with the media on which the data object in secondary storage is stored, then it may be difficult (if not impossible) to recover the data object from the media. If an organization implementing such single instance storage techniques stores only a single instance of the data object in secondary storage, then the data object may also be unrecoverable from secondary storage across the organization.

The organization may attempt to mitigate the consequences associated with this risk by making other secondary and/or tertiary copies of single instanced data objects, such as copies on tape. However, it may slow and/or difficult to recover such secondary and/or tertiary copies from tape.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

BRIEF DESCRIPTION OF THE DRAWINGS

FIG. 7 is a diagram illustrating suitable data structures that may be employed by aspects of the invention.

DETAILED DESCRIPTION

Figure 1:
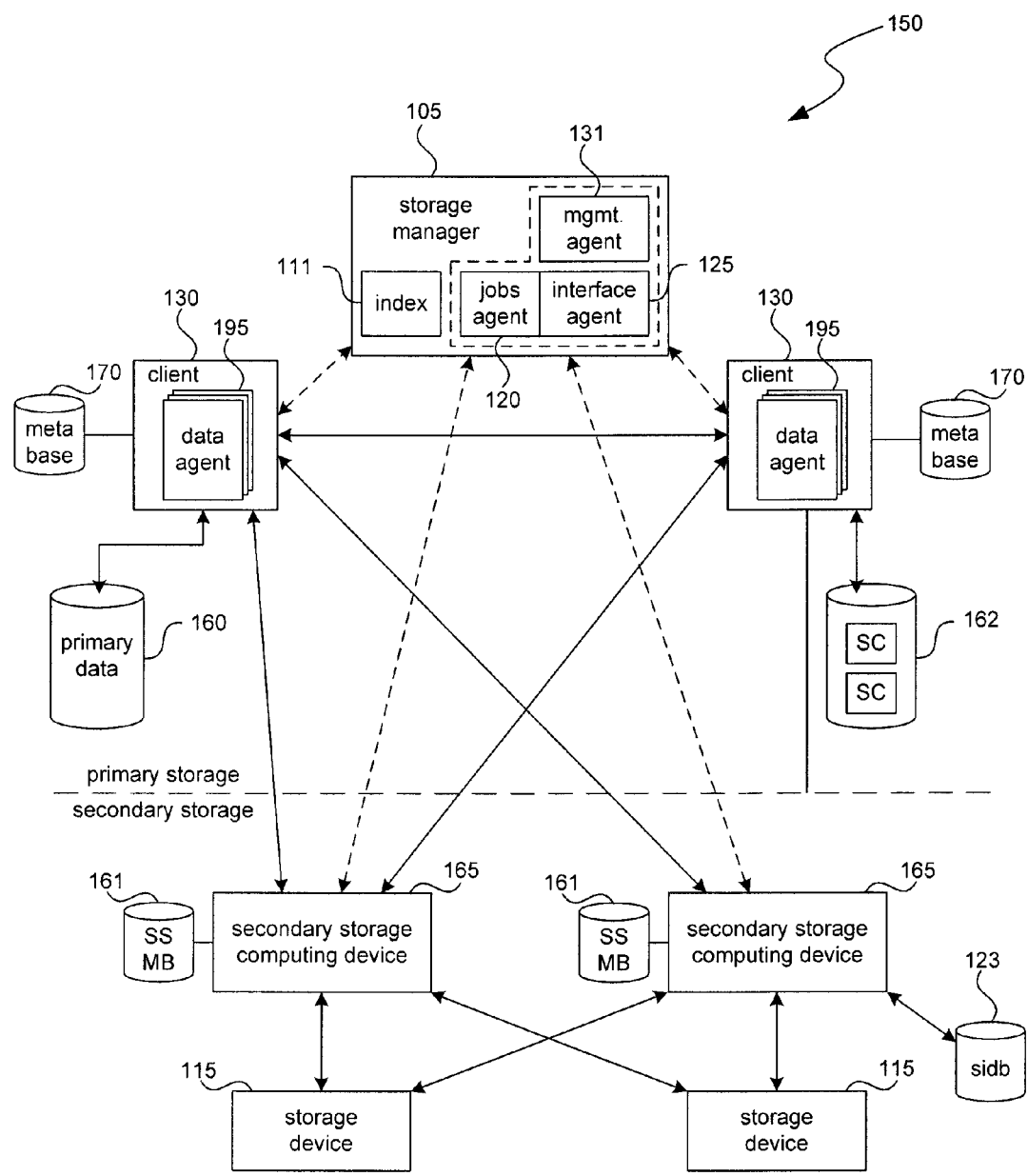
FIG. 1 is a block diagram illustrating an example of a data storage enterprise that may employ aspects of the invention.

The headings provided herein are for convenience only and do not necessarily affect the scope or meaning of the claimed invention.

Overview

Described in detail herein are systems and methods for storing a variable number of instances of data objects in secondary storage across a data storage system (alternatively called a data storage network, a data storage environment, or a data storage enterprise). For example, 1, 2, 3, or up to N−1 instances (where N is the number of instances of the data object in primary data) of a data object may be stored. In some examples, a system for storing a variable number of instances of data objects includes one or more computing devices storing a first set of data objects and multiple data stores storing a second set of data objects. The multiple data stores are configured to store one or more instances of a data object. The system also includes a variable instance database configured to store information associated with the second set of data objects. This information includes, for each of the data objects, an identifier of the data object and a number of instances of the data object already stored on the multiple data stores. In some examples, this information also includes a number of instances of the data object that should be stored on the multiple data stores.

The system also generally includes a secondary storage computing device configured to receive an indication to perform a storage operation, according to a storage policy, on the first set of data objects. The storage policy specifies the number of instances of each data object that should be stored on the multiple data stores. For at least one of the data objects in the first set, two or more instances should be stored on the multiple data stores. In some examples, each instance is stored on one of the multiple data stores. The secondary storage computing device is further configured to, for each of the data objects in the set, determine a substantially unique identifier for the data object, access the variable instance database, and use the generated substantially unique identifier to determine the number of instances of the data object that are already stored on the data stores.

The secondary storage computing device also determines the number of instances of the data object to store on the multiple data stores based at least in part on the number of instances that should be stored and the number of instances already stored. The secondary storage computing device also performs the storage operation on each of the data objects in the first set. Performing the storage operation includes storing on the multiple data stores the determined number of instances of the data object (e.g., by copying the data object from the one or more computing devices to the multiple data stores).

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 2:
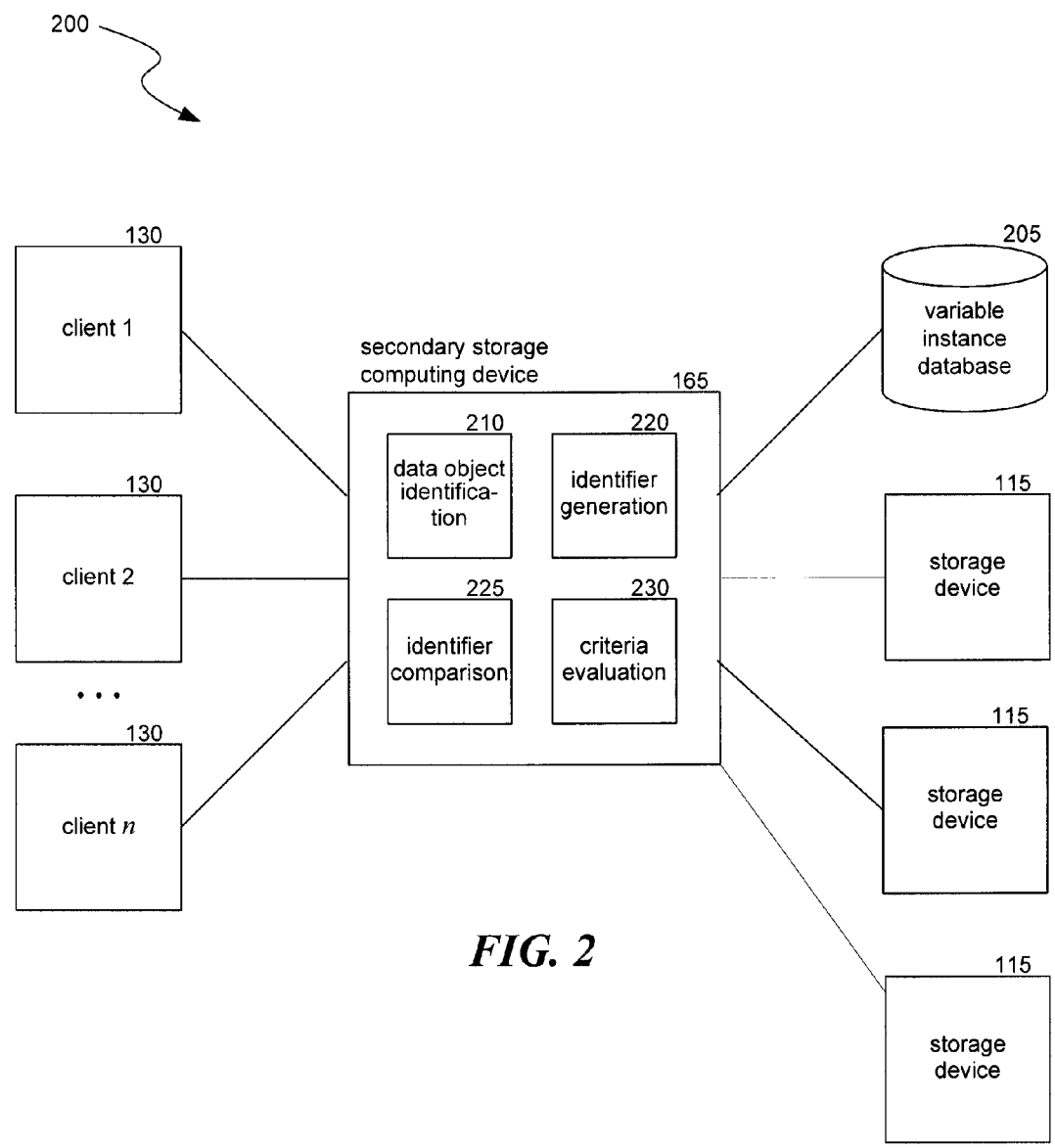
FIG. 2 is a block diagram illustrating an example environment in which aspects of the invention may be configured to operate.

FIGS. 1 and 2 and the discussion herein provide a brief, general description of a suitable specialized environment in which aspects of the invention can be implemented. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular phones, mobile phones, and/or mobile devices, multi-processor systems, microprocessor-based or programmable consumer electronics, set-top boxes, network PCs, mini-computers, mainframe computers, and the like. The terms "computer," "server," "host," "host system," "client," and the like are generally used interchangeably herein, and refer to any of the above devices and systems, as well as any data processor.

While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), and/or the Internet. In a distributed computing environment, program modules may be located in both local and remote memory storage devices.

Aspects of the invention may be stored or distributed on computer-readable media, including tangible computer-readable storage media such as magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless described otherwise below, aspects of the invention may be practiced with conventional data processing and data storage systems. Thus, the construction and operation of the various blocks shown in FIGS. 1 and 2 may be of conventional design, and need not be described in further detail herein to make and use aspects of the invention, because such blocks will be understood by those skilled in the relevant art. One skilled in the relevant art can readily make any modifications necessary to the blocks in FIGS. 1 and 2 (or other embodiments or figures) based on the detailed description provided herein.

Figure 3:
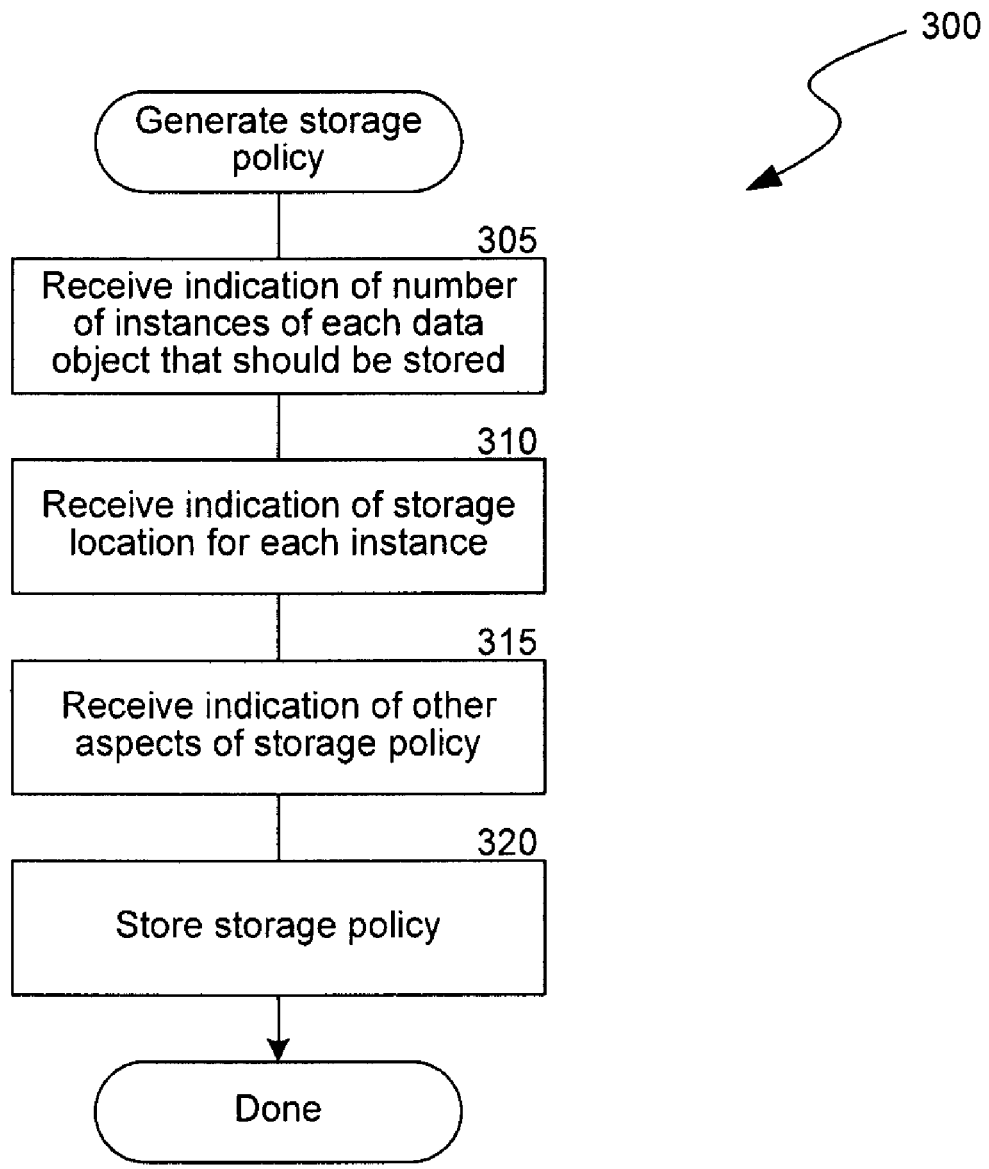
FIG. 3 is a flow diagram of a process for generating a storage policy.
Figure 4A:
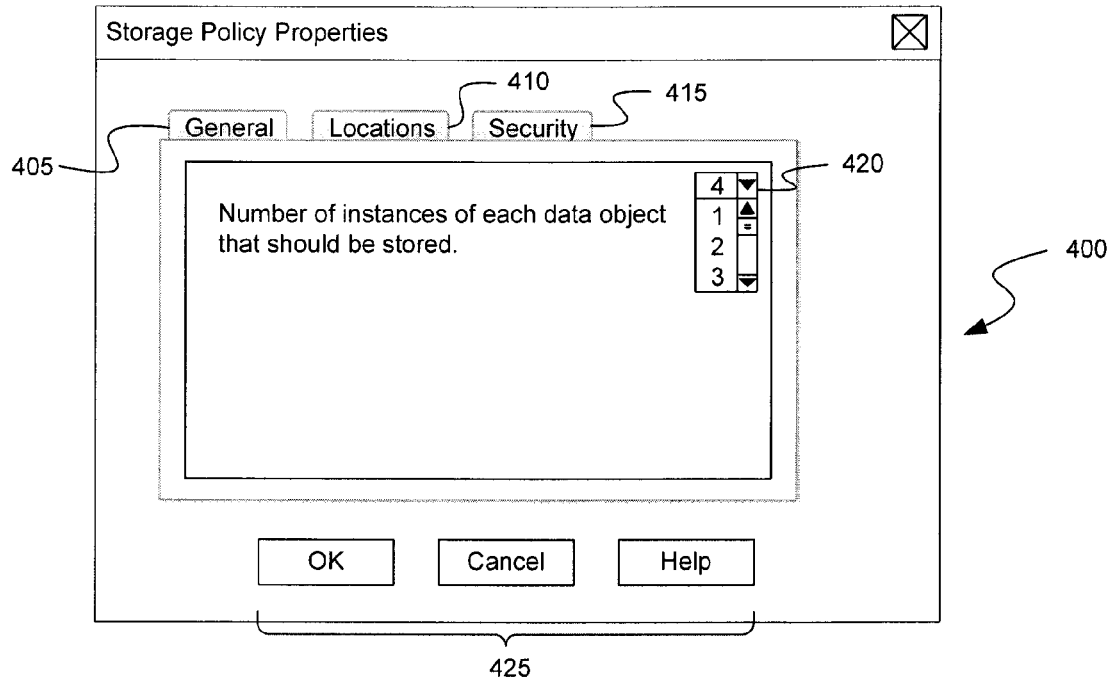
FIGS. 4A and 4B are display diagrams illustrating an example interface provided by aspects of the invention.
Figure 4B:
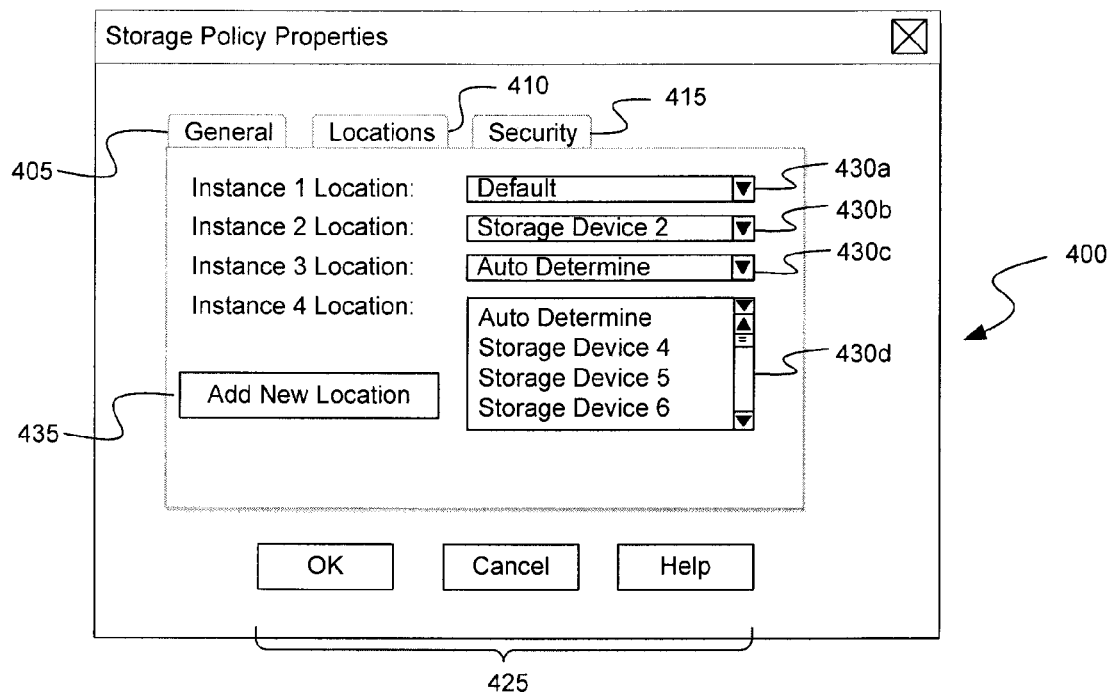
Figure 5:
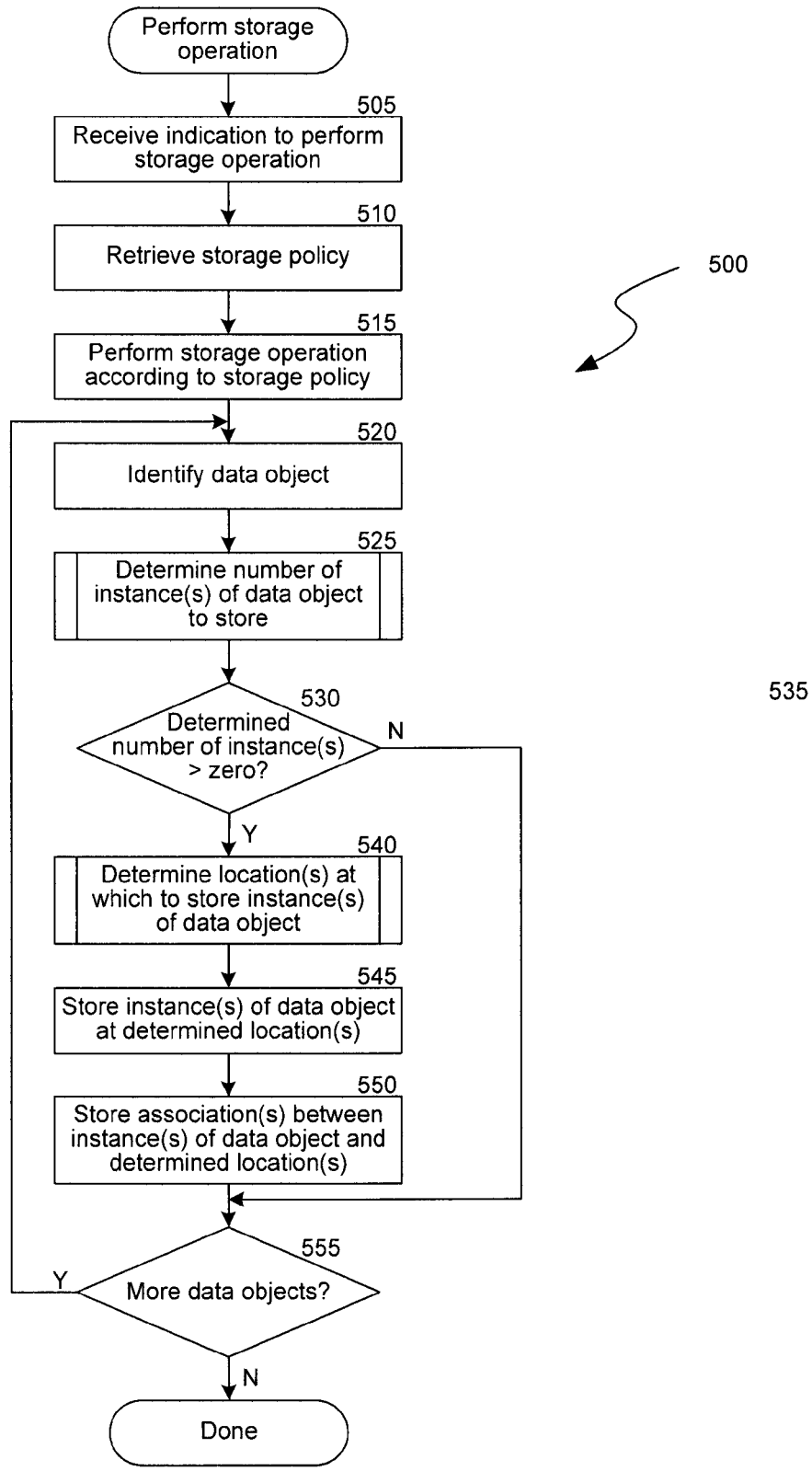
FIG. 5 is a flow diagram of a process for performing a storage operation.
Figure 6:
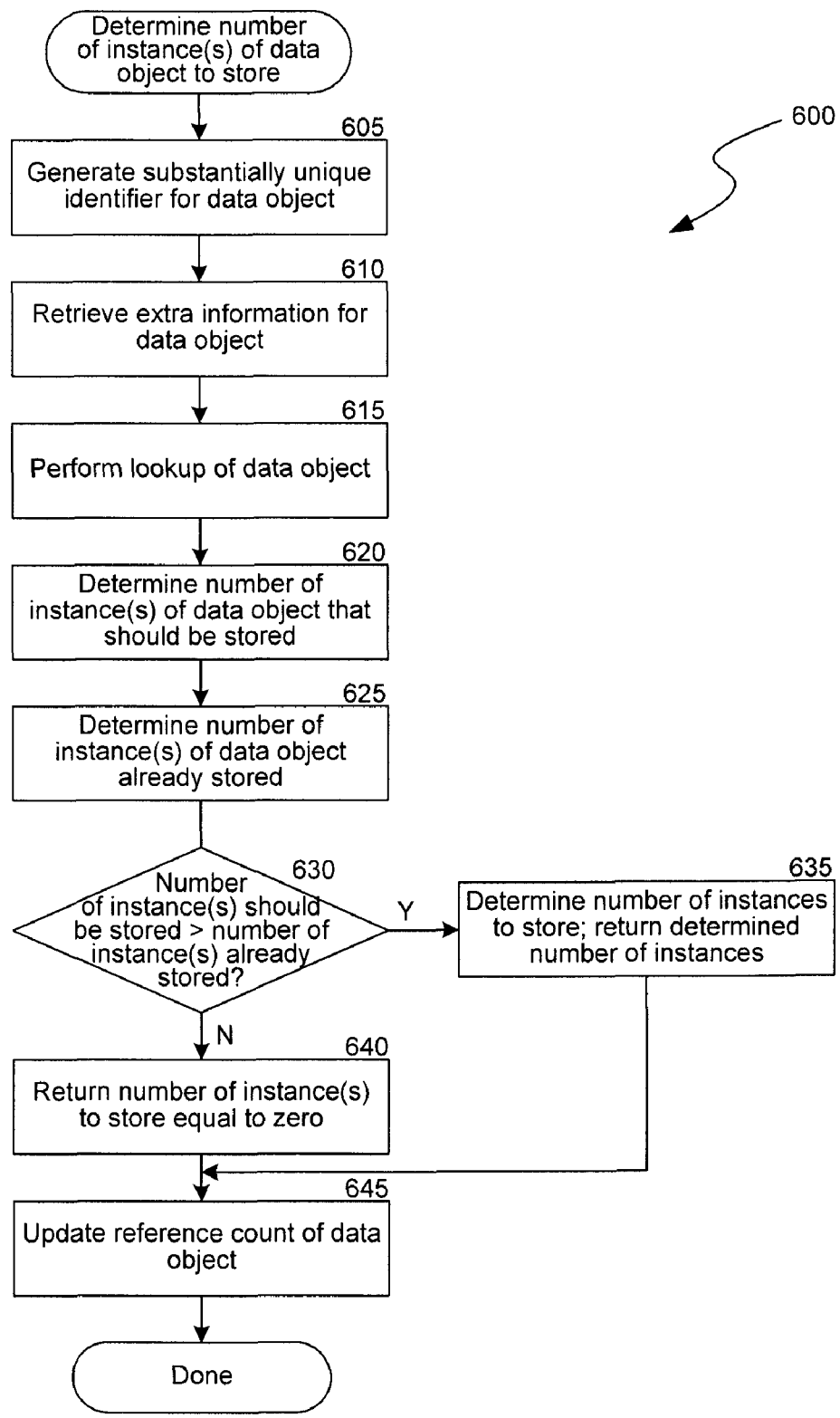
FIG. 6 is a flow diagram of a process for determining a number of instances of a data object to store.
Figure 8:
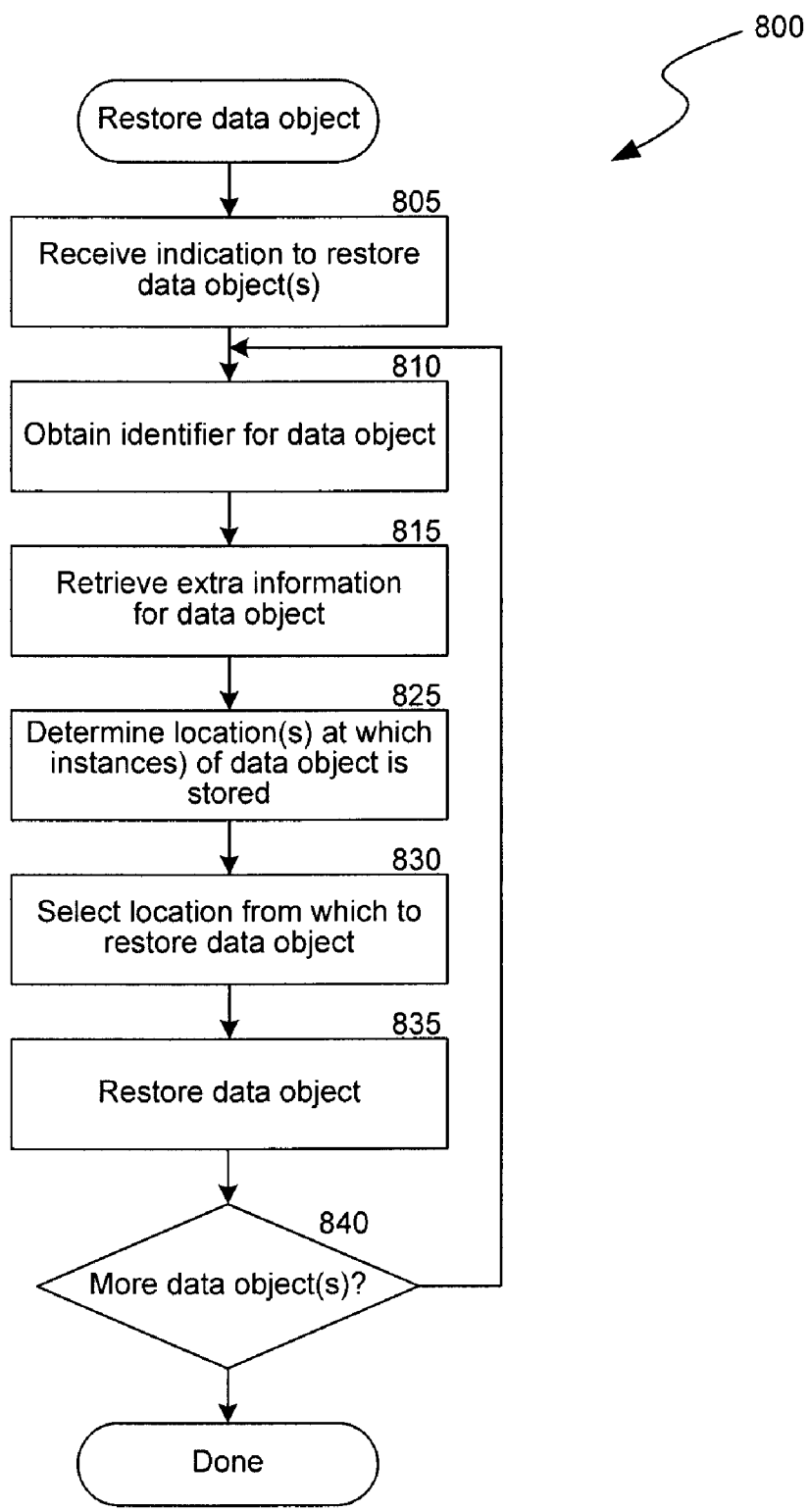
FIG. 8 is a flow diagram of a process for restoring a data object.
Figure 9:
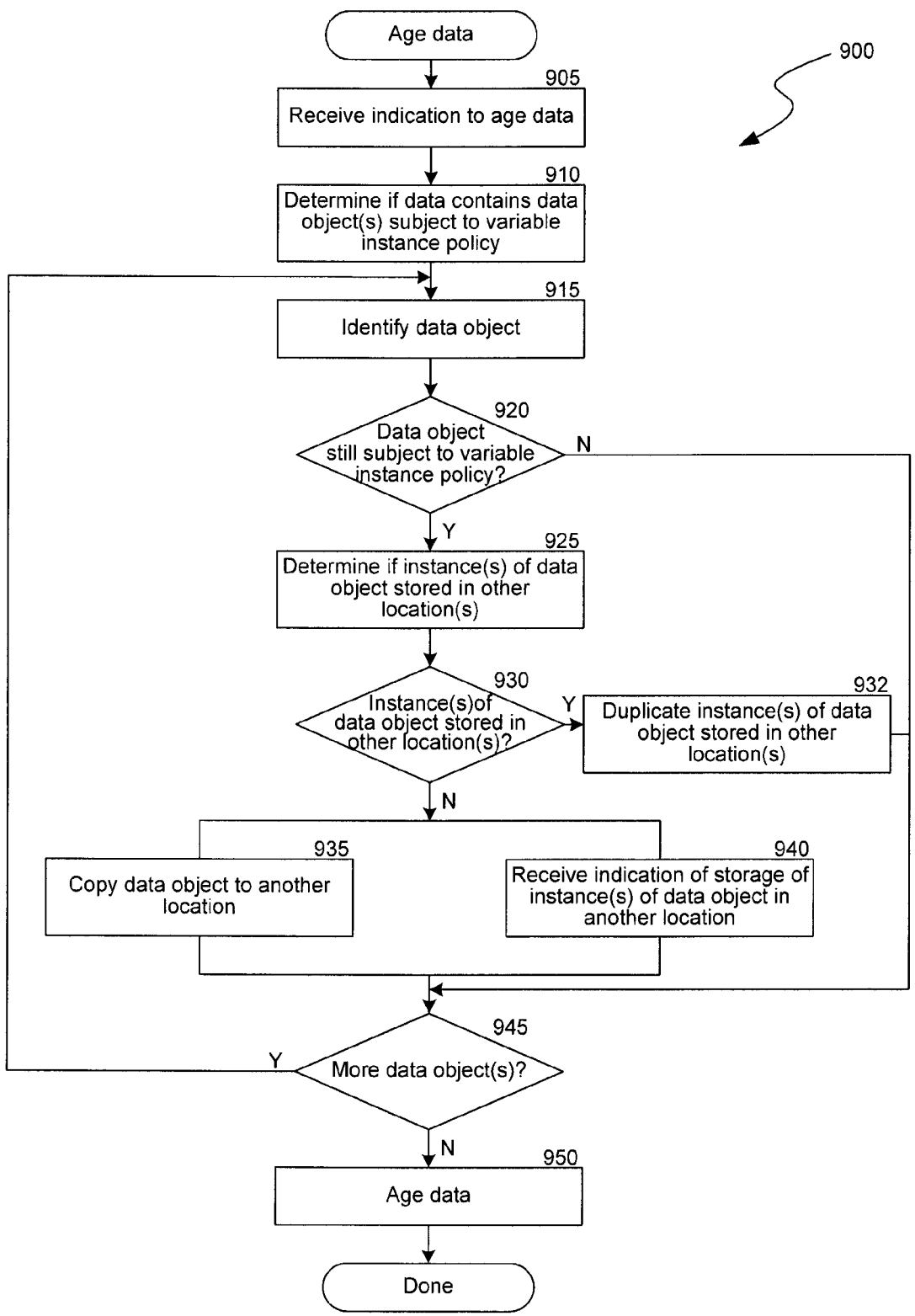
FIG. 9 is a flow diagram of a process for aging data.
Figure 10:
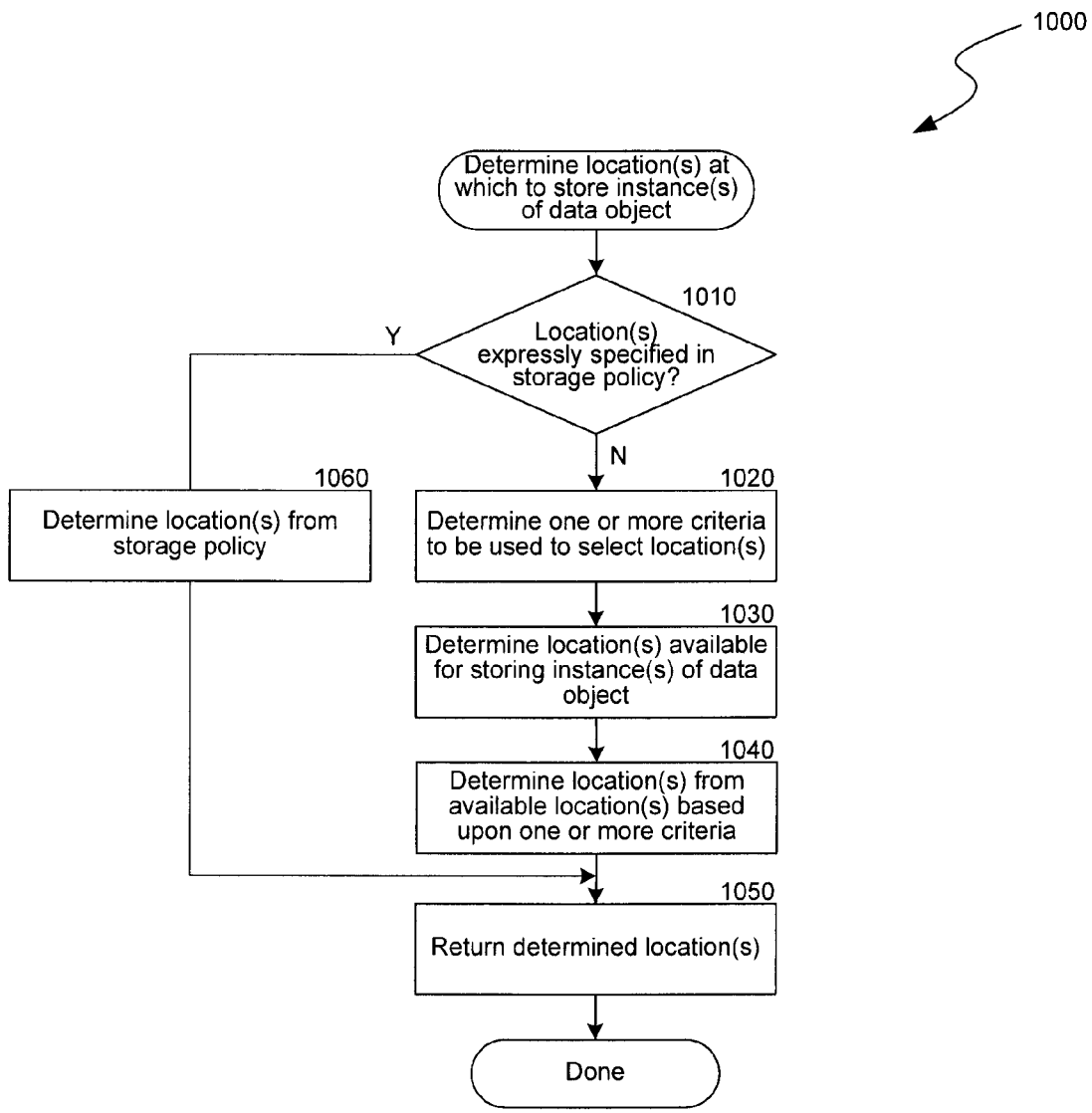
FIG. 10 is a flow diagram of a process for determining locations at which to store instances of data objects.

Aspects of the invention will now be described in detail with respect to FIGS. 1 through 10. FIG. 1 is a block diagram illustrating an example of a data storage enterprise that may employ aspects of the invention. FIG. 2 is a block diagram illustrating an example environment in which aspects of the invention may be configured to operate. FIG. 3 is a flow diagram of a process for generating a storage policy, and FIGS. 4A and 4B are display diagrams illustrating an example interface that may be used to configure aspects of a storage policy generated using the process of FIG. 3. FIG. 5 is a flow diagram of a process for performing a storage operation and FIG. 6 is a flow diagram of a process for determining a number of instances of a data object to store. FIG. 7 is a diagram illustrating suitable data structures that may be employed by aspects of the invention. FIG. 8 is a flow diagram of a process for restoring a data object and FIG. 9 is a flow diagram of a process for aging data. FIG. 10 is a flow diagram of a process for determining locations at which to store instances of data objects.

Suitable Data Storage System

FIG. 1 illustrates an example of one arrangement of resources in a computing network, comprising a data storage system 150. The resources in the data storage system 150 may employ the processes and techniques described herein. The system 150 includes a storage manager 105, one or more data agents 195, one or more secondary storage computing devices 165, one or more storage devices 115, one or more computing devices 130 (called clients 130), one or more data or information stores 160 and 162, and a single instancing database 123. The storage manager 105 includes an index 111, a jobs agent 120, an interface agent 125, and a management agent 131. The system 150 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 150 may also represent a modular storage system such as the CommVault Simpana system, also available from CommVault Systems, Inc.

The system 150 may generally include combinations of hardware and software components associated with performing storage operations on electronic data. Storage operations include copying, backing up, creating, storing, retrieving, and/or migrating primary storage data (e.g., data stores 160 and/or 162) and secondary storage data (which may include, for example, snapshot copies, backup copies, hierarchical storage management (HSM) copies, archive copies, and other types of copies of electronic data stored on storage devices 115). The system 150 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 115, retained for a specified period of time before being aged to another tier of secondary storage, copied to the storage device 115 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. A "retention policy" may specify how long data is to be retained at specific tiers of storage or what criteria must be met before data may be pruned or moved from one tier of storage to another tier of storage. In some cases, the storage policy includes information generally specified by the schedule policy and/or the retention policy. (Put another way, the storage policy includes the schedule policy and/or the retention policy.) Storage policies, schedule policies and/or retention policies may be stored in a database of the storage manager 105, to archive media as metadata for use in restore operations or other storage operations, or to other locations or components of the system 150.

The system 150 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 105 (or management agent 131), a secondary storage computing device 165, a client 130, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 165, client 130, or other network device connected to a primary storage volume, while a storage operation cell configured to perform HSM tasks may instead include a secondary storage computing device 165, client 130, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 105 that coordinates storage operations via the same secondary storage computing devices 165 storage devices 115. This "overlapping" configuration allows storage resources to be accessed by more than one storage manager 105, such that multiple paths exist to each storage device 115 facilitating failover, load balancing, and promoting robust data access via alternative routes.

Alternatively or additionally, the same storage manager 105 may control two or more storage operation cells (whether or not each storage operation cell has its own dedicated storage manager 105). Moreover, in certain embodiments, the extent or type of overlap may be user-defined (through a control console) or may be automatically configured to optimize data storage and/or retrieval.

The clients 130 typically include application software for performing various operations. Clients 130 typically also include an operating system on which the application software runs. A file system can be provided to facilitate and control file access by the operating system and application software. File systems can facilitate access to local and remote storage devices for file or data access and storage. Clients 130 can also include local storage such as a media module media drive with fixed or removable media.

In some examples, the clients 130 include storage mechanisms for allowing computer programs or other instructions or data to be loaded into memory for execution. Such storage mechanisms might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to memory.

Data agent 195 may be a software module or part of a software module that is generally responsible for performing storage operations on the data of the client 130 stored in data store 160/162 or other memory location. Each client 130 may have at least one data agent 195 and the system 150 can support multiple clients 130. Data agent 195 may be distributed between client 130 and storage manager 105 (and any other intermediate components), or it may be deployed from a remote location or its functions approximated by a remote process that performs some or all of the functions of data agent 195.

As used herein, the term module might describe a given unit of functionality that can be performed in accordance with one or more embodiments of the present invention. As used herein, a module might be implemented utilizing any form of hardware, software, firmware, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

The overall system 150 may employ multiple data agents 195, each of which may perform storage operations on data associated with a different application. For example, different individual data agents 195 may be designed to handle Microsoft Exchange data, Lotus Notes data, Microsoft Windows file system data, Microsoft Active Directory Objects data, Microsoft SQL Server data, Microsoft Sharepoint Server data, and other types of data known in the art. Other embodiments may employ one or more generic data agents 195 that can handle and process multiple data types rather than using the specialized data agents described above.

If a client 130 has two or more types of data, one data agent 195 may be required for each data type to perform storage operations on the data of the client 130. For example, to back up, migrate, and restore all the data on a Microsoft Exchange server, the client 130 may use one Microsoft Exchange Mailbox data agent 195 to back up the Exchange mailboxes, one Microsoft Exchange Database data agent 195 to back up the Exchange databases, one Microsoft Exchange Public Folder data agent 195 to back up the Exchange Public Folders, and one Microsoft Windows File System data agent 195 to back up the file system of the client 130. These data agents 195 would be treated as four separate data agents 195 by the system even though they reside on the same client 130.

Alternatively, the overall system 150 may use one or more generic data agents 195, each of which may be capable of handling two or more data types. For example, one generic data agent 195 may be used to back up, migrate and restore Microsoft Exchange Mailbox data and Microsoft Exchange Database data while another generic data agent 195 may handle Microsoft Exchange Public Folder data and Microsoft Windows File System data, etc.

Data agents 195 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 105 or secondary storage computing devices 165. As used herein, a file or a data object refers to any collection or grouping of bytes of data that can be viewed as one or more logical units.

Generally speaking, storage manager 105 may be a software module or other application that coordinates and controls storage operations performed by the system 150. Storage manager 105 may communicate with some or all elements of the system 150, including clients 130, data agents 195, secondary storage computing devices 165, and storage devices 115, to initiate and manage storage operations (e.g., backups, migrations, data recovery operations, etc.).

Storage manager 105 may include a jobs agent 120 that monitors the status of some or all storage operations previously performed, currently being performed, or scheduled to be performed by the system 150. (One or more storage operations are alternatively referred to herein as a "job" or "jobs.") Jobs agent 120 may be communicatively coupled to an interface agent 125 (e.g., a software module or application). Interface agent 125 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 125, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 115).

Storage manager 105 may also include a management agent 131 that is typically implemented as a software module or application program. In general, management agent 131 provides an interface that allows various management agents 131 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 125. This allows each storage operation cell to send and receive certain pertinent information from other storage operation cells, including status information, routing information, information regarding capacity and utilization, etc. These communications paths may also be used to convey information and instructions regarding storage operations.

For example, a management agent 131 in a first storage operation cell may communicate with a management agent 131 in a second storage operation cell regarding the status of storage operations in the second storage operation cell. Another illustrative example includes the case where a management agent 131 in a first storage operation cell communicates with a management agent 131 in a second storage operation cell to control storage manager 105 (and other components) of the second storage operation cell via management agent 131 contained in storage manager 105.

Another illustrative example is the case where management agent 131 in a first storage operation cell communicates directly with and controls the components in a second storage operation cell and bypasses the storage manager 105 in the second storage operation cell. If desired, storage operation cells can also be organized hierarchically such that hierarchically superior cells control or pass information to hierarchically subordinate cells or vice versa.

Storage manager 105 may also maintain an index, a database, or other data structure 111. The data stored in database 111 may be used to indicate logical associations between components of the system, user preferences, management tasks, media containerization and data storage information or other useful data. For example, the storage manager 105 may use data from database 111 to track logical associations between secondary storage computing device 165 and storage devices 115 (or movement of data as containerized from primary to secondary storage).

Generally speaking, the secondary storage computing device 165, which may also be referred to as a media agent, may be implemented as a software module that conveys data, as directed by storage manager 105, between a client 130 and one or more storage devices 115 such as a tape library, a magnetic media storage device, an optical media storage device, or any other suitable storage device. In one embodiment, secondary storage computing device 165 may be communicatively coupled to and control a storage device 115. A secondary storage computing device 165 may be considered to be associated with a particular storage device 115 if that secondary storage computing device 165 is capable of routing and storing data to that particular storage device 115.

In operation, a secondary storage computing device 165 associated with a particular storage device 115 may instruct the storage device to use a robotic arm or other retrieval means to load or eject a certain storage media, and to subsequently archive, migrate, or restore data to or from that media. Secondary storage computing device 165 may communicate with a storage device 115 via a suitable communications path such as a SCSI or Fibre Channel communications link. In some embodiments, the storage device 115 may be communicatively coupled to the storage manager 105 via a SAN.

Each secondary storage computing device 165 may maintain an index, a database, or other data structure 161 that may store index data generated during storage operations for secondary storage (SS) as described herein, including creating a metabase (MB). For example, performing storage operations on Microsoft Exchange data may generate index data. Such index data provides a secondary storage computing device 165 or other external device with a fast and efficient mechanism for locating data stored or backed up. Thus, a secondary storage computing device index 161, or a database 111 of a storage manager 105, may store data associating a client 130 with a particular secondary storage computing device 165 or storage device 115, for example, as specified in a storage policy, while a database or other data structure in secondary storage computing device 165 may indicate where specifically the data of the client 130 is stored in storage device 115, what specific files were stored, and other information associated with storage of the data of the client 130. In some embodiments, such index data may be stored along with the data backed up in a storage device 115, with an additional copy of the index data written to index cache in a secondary storage device. Thus the data is readily available for use in storage operations and other activities without having to be first retrieved from the storage device 115.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 115. In some embodiments, the cached information may include information regarding format or containerization of archives or other files stored on storage device 115.

One or more of the secondary storage computing devices 165 may also maintain one or more single instance databases 123. Single instancing (alternatively called data deduplication) generally refers to storing in secondary storage only a single instance of each data object (or data block) in a set of data (e.g., primary data). More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS); 2) U.S. patent application Ser. No. 12/145,347 (entitled APPLICATION-AWARE AND REMOTE SINGLE INSTANCE DATA MANAGEMENT); or 3) U.S. patent application Ser. No. 12/145,342 (entitled APPLICATION-AWARE AND REMOTE SINGLE INSTANCE DATA MANAGEMENT), 4) U.S. patent application Ser. No. 11/963,623 (entitled SYSTEM AND METHOD FOR STORING REDUNDANT INFORMATION); 5) U.S. patent application Ser. No. 11/950,376 (entitled SYSTEMS AND METHODS FOR CREATING COPIES OF DATA SUCH AS ARCHIVE COPIES); 6) U.S. patent application Ser. No. 12/565,576 (entitled SYSTEMS AND METHODS FOR MANAGING SINGLE INSTANCING DATA); or 7) U.S. patent application Ser. No. 12/647,906 (entitled BLOCK-LEVEL SINGLE INSTANCING), each of which is incorporated by reference herein in its entirety.

In some embodiments, certain components may reside and execute on the same computer. For example, in some embodiments, a client 130 such as a data agent 195, or a storage manager 105, coordinates and directs local archiving, migration, and retrieval application functions as further described in the previously-referenced U.S. patent application Ser. No. 09/610,738. This client 130 can function independently or together with other similar clients 130.

As shown in FIG. 1, each secondary storage computing device 165 has its own associated metabase 161. Each client 130 may also have its own associated metabase 170. However in some embodiments, each "tier" of storage, such as primary storage, secondary storage, tertiary storage, etc., may have multiple metabases or a centralized metabase, as described herein. For example, rather than a separate metabase or index associated with each client 130 in FIG. 1, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 105 or other management module may keep track of certain information that allows the storage manager 105 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 130, and can contain either all of the data of the clients 130 or a designated subset thereof. As depicted in FIG. 1, the data store 162 includes two sub-clients. For example, an administrator (or other user with the appropriate permissions; the term administrator is used herein for brevity) may find it preferable to separate email data from financial data using two different sub-clients having different storage preferences, retention criteria, etc.

Components of a Variable Instancing System

FIG. 2 is a block diagram illustrating an environment 200 in which aspects of the invention may be configured to operate. The environment 200 includes one or more clients 130, a secondary storage computing device 165, a variable instance database 205, and multiple storage devices 115. Each of the clients 130 is a computing device, examples of which are described herein. The clients 130 are connected to the secondary storage computing device 165. The secondary storage computing device 165 is connected to the variable instance database 205, which includes a data store, and to the storage devices 115, which include data stores. In some examples, the clients 130 maintain their own variable instance database 205.

Both the variable instance database 205 and the storage devices 115 may be any type of storage suitable for storing data, such as Directly-Attached Storage (DAS) such as hard disks, storage devices in a Storage Area Network (SAN), e.g., a Fibre Channel SAN, an iSCSI SAN or other type of SAN, Network-Attached Storage (NAS), a tape library, optical media, or any other type of storage. The variable instance database 205 may comprise two or more data stores (e.g., in distributed fashion), or may be stored on a storage device using a Redundant Array of Independent Disks (RAID), for load-balancing, data reliability, increased input/output, and/or other purposes.

The storage devices 115 may all be in the same system 150 (as is illustrated in FIG. 1) or the storage devices 115 may be arranged or positioned in two or more storage operation cells. For example, two or more storage devices 115 may be part of two or more storage operation cells 150 that are hierarchically organized. Generally, each of the storage devices 115 stores only a single instance of a data object. In some examples, each of the storage devices 115 can store multiple instances of a data object, but one single storage device 115 would not typically store all instances of a data object originally identified by the secondary storage computing device 165 as for variable instancing storage (however, one single storage device 115 could be configured to store all instance).

The clients 130 (and their data stores 160/162) are distinct from the storage devices 115. Another way of stating this is that the intersection of the set of the clients 130 and the set of the storage devices 115 is empty. Put another way, the set of the clients 130 and the set of the storage devices 115 is disjoint. Described yet another way, there are no common elements between the set of the clients 130 and the set of the storage devices 115.

The secondary storage computing device 165 includes various components, each of which performs various functions. These components include a data object identification component 210, an identifier generation component 220, an identifier comparison component 225, and a criteria evaluation component 230. The data object identification component 210 identifies data objects, such as in response to a storage operation. For example, a client 130 may transfer data objects to be variable instanced to the secondary storage computing device 165 in one or more streams of contiguous data. The data object identification component 210 identifies data objects within the streams of contiguous data.

The identifier generation component 220 generates a substantially unique identifier for the data object. Examples of a substantially unique identifier include a hash value, message digest, checksum, digital fingerprint, digital signature or other sequence of bytes that substantially uniquely identifies the data object. For example, substantially unique identifiers could be generated using Message Digest Algorithm 5 (MD5) or Secure Hash Algorithm SHA 512. In some instances, the word "substantially" is used to modify the term "unique identifier" because algorithms used to produce hash values may result in collisions, where two different data objects, when hashed, result in the same hash value. However, depending upon the algorithm or cryptographic hash function used, collisions should be suitably rare and thus the identifier generated for a file or data object should be unique throughout the data storage system. The term "probabilistically unique identifier" may also be used. In this case, the work "probabilistically" is used to indicate that collisions should be low-probability occurrences, and, therefore, the identifier should be unique throughout the data storage system. In some cases, only the word "identifier" is used to describe what the identifier generation component 220 generates for a data object.

The identifier comparison component 225 performs comparisons of substantially unique identifiers of various data objects to determine if the data objects are substantially similar. Two data objects are substantially similar as long as they contain the same data, even if certain metadata such as their names (e.g., file names), their security information (e.g., access control lists (ACLs)), their descriptive information, their timestamps, etc., are different. Two substantially similar data objects will therefore have the same substantially unique identifier. The identifier comparison component 225 can compare a data object's substantially unique identifier to determine if it matches any substantially unique identifiers of other data objects stored in the variable instance database 205.

The criteria evaluation component 230 evaluates aspects of data objects against a set of criteria. For example, the criteria evaluation component 230 may examine the size of the data object to determine if it is eligible for variable instancing. Data objects smaller than a predetermined size (e.g., 64 kb) may not be eligible for variable instancing. As another example, another criterion used by the criteria evaluation component 230 may be whether the data object is determined to be data or of type data (as opposed to metadata or of type metadata). As another example, another criterion used by the criteria evaluation component 230 may be to only use reference data objects that have been stored in storage devices 115 for less than a specific period of time. Put another way, a data object that has been stored in a storage device 115 longer than a predetermined period of time (e.g., 90 days) may not qualify as a valid instance in a variable instancing operation. The secondary storage computing device 165 may also contain other components that perform other functions.

The clients 130, as part of their functioning, utilize data, which includes files, directories, metadata (e.g., ACLs and any other streams associated with the data), and other data objects. (More details as to storage operations involving ACLs may be found in the assignee's U.S. patent application Ser. No. 12/058,518, entitled SYSTEM AND METHOD FOR STORAGE OPERATION ACCESS SECURITY, the entirety of which is incorporated by reference herein.) The data on the clients 130 is generally primary data (e.g., production data). During a storage operation, the clients 130 (e.g., the data agents 195) send a copy of each data object in their data to the secondary storage computing device 165.

Upon receiving the data object, the secondary storage computing device 165 (e.g., the identifier generation component 220) generates a substantially unique identifier for the data object. The secondary storage computing device 165 determines the number of instances of the data object that should be stored on the storage devices 115. To determine this, the secondary storage computing device 165 accesses a storage policy and analyzes the storage policy to determine the number of instances of the data object that should be stored on the storage devices 115. Additionally or alternatively, the secondary storage computing device 165 may access the variable instance database 205 to determine the number of instances of the data object that should be stored on the storage devices 115. The variable instance database 205 utilizes one or more tables or other data structures (e.g., the tables 700, 740, and/or 760 illustrated in FIG. 7) to store the substantially unique identifiers of the data objects. The variable instance database 205 also stores a count of the number of instances of each data object that should be stored on the storage devices 115 and a count of the number of instances of each data object that is already stored on the storage devices 115.

If the number of instances of the data object that should be stored on the storage devices 115 is less than the number of instances of the data object that are already stored on the storage devices 115, the secondary storage computing device 165 sends a copy of the data object to one or more of the storage devices 115 for storage and if necessary, adds its substantially unique identifier to the variable instance database 205. The secondary storage computing device 165 also adds a pointer to the location at which the data object is stored to the variable instance database 205. If a sufficient number of instances of the data object has already been stored, the secondary storage computing device 165 can avoid sending another instance of the data object to the storage devices 115. In this case, the secondary storage computing device 165 may add a reference (e.g., to an index in the variable instance database 205, such as by incrementing a reference count in the table 700 illustrated in FIG. 7) to the already stored instance of the data object. After the instance of the data object has been stored, various post-processing operations may be performed upon the data object (e.g., indexing the content of the data object, classifying its content, encrypting the data object, and/or compressing it).

Instead of the clients 130 sending the data objects to the secondary storage computing device 165, and the secondary storage computing device 165 generating the substantially unique identifiers, the clients 130 can themselves generate a substantially unique identifier for each data object and transmit the substantially unique identifiers to the secondary storage computing device 165 for lookup in the variable instance database 205. Alternatively or additionally, the clients 130 can perform the lookup of the data objects in the variable instance database 205. If the secondary storage computing device 165 determines that a sufficient number of instances of a data object has not already been stored on the storage devices 115, the secondary storage computing device 165 can instruct the client 130 to send it a copy of the data object, which it then stores on the storage devices 115. Alternatively or additionally, the client 130 itself can send the copy of the data object to the storage devices 115. More details as to the generation of substantially unique identifiers may be found in the assignee's U.S. patent application Ser. No. 12/058,367, entitled SYSTEM AND METHOD FOR STORING REDUNDANT INFORMATION, the entirety of which is incorporated by reference herein.

The secondary storage computing device 165 can support encrypted data objects. For example, one client 130 could generate a substantially unique identifier for a data object and then encrypt it using one encryption algorithm. Another client 130 could generate a substantially unique identifier for another data object and then encrypt it using another encryption algorithm. Additionally or alternatively, the secondary storage computing device 165 can both generate the substantially unique identifiers and encrypt the data objects. If the two data objects are substantially similar, they will both have the same substantially unique identifier. The secondary storage computing device 165 can then store both encrypted instances of the data object or only a single encrypted instance.

The secondary storage computing device 165 can also support compressed data objects. In general, the same compression algorithm may be used to compress data objects. Therefore, the secondary storage computing device 165 can generate a substantially unique identifier for a data object before or after it has been compressed because two substantially similar data objects that have been compressed will typically have the same substantially unique identifier. More details as to how the secondary storage computing device 165 can support encryption and compression in a single instancing system may be found in the assignee's U.S. patent application Ser. Nos. 12/145,342 and 12/145,347, both entitled APPLICATION-AWARE AND REMOTE SINGLE INSTANCE DATA MANAGEMENT, the entireties of each of which are incorporated by reference herein. Such encryption and compression techniques may be equally applicable to the systems and methods described herein.

Process for Receiving a Storage Policy

FIG. 3 is a flow diagram illustrating a process performed by the storage manager 105 to generate a storage policy. For example, the storage manager 105 or a component thereof (e.g., the interface agent 125) may receive a storage policy from an administrator (or other user with the appropriate permissions; the term administrator is used herein for brevity) that specifies a number of instances of each data object to store. As another example, a first storage manager 105 in a first storage operation cell in an organization of multiple storage operation cells may receive a storage policy from a second storage manager 105 of a second storage operation cell (e.g., the second storage manager is superior to the first storage manager in a hierarchical organization of storage operation cells). As another example, the storage policy may be installed by default on a computing device (e.g., as part of a software installation process).

In general, for ease in describing features of the invention, aspects of the invention will now be described in terms of an administrator interacting with the storage manager 105 via his or her computer. As implemented, however, the administrator's computer receives data input by the administrator and transmits such input data to the storage manager 105. The storage manager 105 may query the index 111, retrieve requested pages or information, perform computations and/or provide output data back to the administrator's computer, typically for visual display to the administrator. Thus, for example, under step 305, the administrator provides input specifying a number of instances of each data object to store. The storage manager 105 receives this input and processes it accordingly.

The process 300 begins at step 305 when the storage manager 105 receives an indication of a number of instances of each data object that should be stored under this storage policy. For example, the administrator may utilize an integrated management console that provides an interface to allow the administrator to specify the number of instances of each data object that is subject to the storage policy. FIG. 4A illustrates an example of such an interface. As another example, the storage manager 105 could receive the indication of the number of instances from another storage manager 105 of another storage operation cell 150 (e.g., from another storage manager 105 that is superior to it in a hierarchical arrangement of storage operation cells 150).

At step 310 the storage manager 105 receives an indication of one or more locations at which to store the instances of the data objects subject to the storage policy. For example, the integrated management console may provide an interface that allows the administrator to specify one or more locations at which to store one or more instances of each data object subject to the storage policy. FIG. 4B illustrates an example of such an interface. As another example, the storage manager 105 could receive the indication of the storage locations from another storage manager 105 of another storage operation cell 150 (e.g., from another storage manager 105 that is superior to it in a hierarchical organization of storage operation cells 150).

At step 315 the storage manager 105 may receive an indication of other aspects of the storage policy. For example, the administrator may optionally specify network pathways to utilize in storage operations, retention policies, data characteristics, compression or encryption requirements, preferred system components to utilize in storage operations, and other criteria relating to storage operations performed under the storage policy. At step 320 the storage manager 105 stores the storage policy in a data store (e.g., in the index 111). The process 300 then concludes.

Interfaces for Configuring Storage Operations

Referring to FIGS. 4A and 4B, representative computer displays or web pages for configuring aspects of a storage policy are illustrated. The screens of FIGS. 4A and 4B may be implemented in any of various ways, such as in C++ or as web pages in XML (Extensible Markup Language), HTML (HyperText Markup Language) or any other scripts or methods of creating displayable data, such as the Wireless Access Protocol ("WAP"). The screens or web pages provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

FIGS. 4A and 4B are display diagrams illustrating an example interface 400 provided by aspects of the invention that may be used by an administrator to configure aspects of a storage policy. The interface 400 includes a "General" tab 405 on which the administrator may specify the number of instances of each data object that should be stored (e.g., the number of instances of each data object that should be stored for each storage operation conducted under the storage policy, or the number of instances of each data object that should be stored among or across multiple storage devices 115). The administrator may specify the number of instances using the combo box 420.

The administrator may specify any number of instances. One limit to the number of instances may be the number of storage devices 115 available for storing instances of data objects. A default number of instances (e.g., one instance, three instances) may be used if the administrator does not affirmatively specify a number of instances. The number specified may be used for all data objects, or the administrator may categorize and/or classify data objects and specify different numbers for different categories and/or classifications. For example, a set of clients 130 storing production data may use a relatively high number of instances, whereas a set of clients storing test or development data may use a relatively low number.

The interface 400 also includes a "Locations" tab 410 on which the administrator may specify the locations at which instances of data objects are to be stored and a "Security" tab 415 on which the administrator may specify security credentials for use in performing storage operations. The interface 400 also includes buttons 425, which enable the administrator to confirm or cancel the selections and/or view help regarding the interface 400.

FIG. 4B illustrates the interface 400 when the administrator selects the "Locations" tab 410. The administrator may specify a location for each one of the instances specified on the "General" tab 405. For example, if the administrator specifies four instances of each data object are to be stored under the "General" tab 405, the "Locations" tab will allow the administrator to specify a location for each of the four instances. For example, as illustrated in FIG. 4B, a "Default" location is selected in list box 430a for the location of the first instance. This "Default" location may be one of the storage devices 115 in the same storage operation cell as the client 130 storing the data objects. Because clients 130 may be in different storage operation cells, the "Default" location may vary by client 130.

A storage device 115 named "Storage Device 2" is selected in list box 430b, indicating that it is a predetermined (i.e., pre-selected prior to run-time) storage device 115. The option "Auto Determine" is selected in list box 430c. This indicates that when the storage operation is being performed which storage device 115 to use is to be automatically or dynamically determined (i.e., at run-time). The storage manager 105 may use various factors or criteria in determining which storage device 115 to use, such as a storage capacity of each of multiple storage devices 115, a speed or throughput of storage operations performed using each of multiple storage devices 115, an availability of each of multiple storage devices 115, a power consumption of each of multiple storage devices 115, etc. More details as to power management with regards to data storage operations may be found in International Pat. App. No. PCT/US2008/074686 (entitled POWER MANAGEMENT OF DATA PROCESSING RESOURCES, SUCH AS POWER ADAPTIVE MANAGEMENT OF DATA STORAGE OPERATIONS), the entirety of which is incorporated by reference herein.

The list box 430d is expanded, showing the options available for storage of the fourth instance of data objects, which includes "Auto Determine" and several named storage devices 115: "Storage Device 4," "Storage Device 5," and "Storage Device 6." Each list box 430 may provide as options all (or a subset thereof) of the storage devices 115 that are available throughout an organization implementing the systems and methods described herein. For example, if the organization implements storage operation cells organized in a hierarchical fashion, all the storage devices 115 throughout the hierarchically organized storage operation cells may be provided as options in each of the list boxes 430. As another example, if the organization implements storage operation cells organized in a hierarchical fashion, only the storage devices 115 in storage operation cells subordinate to the storage operation cells in which the client 130 storing the data objects is located may be provided as options in each of the list boxes 430. The storage manager 105 may query a table or other data structure (e.g., the table 760 illustrated in FIG. 7) to determine locations that are available as options for storing data. Those of skill in the art will understand that other techniques may be used to determine locations for storing data.

Although the "Locations" tab 410 provides selections for only four locations, if the administrator had specified more or fewer instances (on the "General" tab 405), the "Locations" tab 410 would enable the administrator to select locations for each of the instances specified. The administrator can also add new locations by selecting the "Add New Location" button 435. This causes the storage manager 105 to provide an interface that allows the administrator to add new locations for storing data, remove existing locations, and/or modify locations in other fashions.

The interface 400 may also allow the administrator to configure other aspects of the storage policy. For example, the interface 400 may allow the administrator to specify how long to keep instances of a data object stored under the storage policy. The administrator may specify a date after which instances of the data object may be aged. Movement of data from one tier of storage to a subsidiary tier of storage (e.g., from secondary storage to tertiary storage) may be generally referred to as "aging data," and is discussed in more detail herein. Additionally or alternatively, for each instance of the data object, the administrator may specify a date after which the instance can be aged. Additionally or alternatively, the administrator may specify that the instances of the data object may be aged when the source data object (e.g., the data object in the primary copy of data) is aged. Additionally or alternatively, the administrator may specify a schedule for aging instances of the data object (e.g., after one year, only half of the original number of the data instances need to be kept, after two years, only one quarter of the original number of the data instances need to be kept, etc.). Those of skill in the art will understand that the administrator may specify criteria and/or rules for aging instances of data objects in various fashions.

When aging instances of data objects, the storage manager 105 may apply rules and/or criteria in order to optimize available storage space. For example, if a number of instances of a data object can be aged, the storage manager 105 may select the instances on storage devices 115 having the least available storage space, in order to free up available storage space. Additionally or alternatively, the storage manager 105 may select the instances on the most frequently used storage devices 115. Additionally or alternatively, the storage manager 105 may select the instances on storage devices 115 having the slowest times to store data or access stored data or the fastest times to store data or access stored data. Additionally or alternatively, the storage manager 105 may select the instances on storage devices to minimize cost, reduce power consumption, to minimize the risk of data loss, in accordance with data classification operations, in accordance with storage policies, and/or other factors. Those of skill in the art will understand that the storage manager 105 may apply rules and/or criteria in various fashions in order to optimize available storage space when aging instances of data objects.

Processes for Performing a Storage Operation

FIG. 5 is a flow diagram of a process 500 for performing a storage operation, such as a storage operation according to a storage policy having aspects configured by an administrator using the interface 400 illustrated in FIGS. 4A and 4B. One or more of the entities illustrated in FIG. 1 may perform different aspects of the storage operation. In some examples, the storage manager 105 instigates the storage operation by sending an indication specifying the storage operation to the data agent 195 on the client 130. The data agent 195 performs the storage operation specified in the indication on the data of the client 130. The data agent 195 sends the data to the secondary storage computing device 165, which then stores the data on one or more storage devices 115. In some examples, less than all of these entities may be involved in performing the storage operation. The processes described herein are indicated as being performed by the secondary storage computing device 165, although those of skill in the art will understand that aspects of the process 500 may be performed by any one of the entities described herein (e.g., the clients 130, the storage manager 105, etc.).

The process 500 begins at step 505 when the secondary storage computing device 165 receives an indication to perform the storage operation. At step 510 the secondary storage computing device 165 retrieves the associated storage policy (e.g., from the index 111). The storage policy may specify one or more storage operations (referred to as a storage operation in the singular for brevity) to perform. For example, the storage policy may specify that the secondary storage computing device 165 is to cause primary storage data (e.g., the data in data stores 160/162) to be copied to storage devices 115. At step 520 the secondary storage computing device 165 (e.g., the data object identification component 210) identifies data objects subject to the storage operation. At step 525 the secondary storage computing device 165 determines the number of instances of the data object to store. This determination is discussed with reference to the process 600 illustrated in FIG. 6.

At step 530, the secondary storage computing device 165 evaluates whether the determined number of instances of the data object to store is greater than zero. If the storage manager 105 is to store one or more instances of the data object, the process 500 continues to step 540, where the storage manager 105 determines the one or more locations at which to store the one or more instances of the data object. This determination is discussed with reference to the process 1000 illustrated in FIG. 10 At step 545, the secondary storage computing device 165 stores the one or more instances of the data object at the determined one or more locations. At step 550 the secondary storage computing device 165 stores one or more associations between the one or more instances of the data object and the one or more locations (e.g., in the table 740 in the variable instancing database 205 illustrated in FIG. 7). Additionally or alternatively, the secondary storage computing device 165 updates one or more existing associations to reflect one or more new locations at which the one or more instances have been stored. At step 555 the storage manager determines whether there are more data objects subject to the storage operation. If so, the process 500 returns to step 520. If not, the process 500 concludes. At step 530, if the secondary storage computing device 165 determines that no instances of the data object are to be stored, the process 500 continues to step 555.

FIG. 6 is a flow diagram of a process 600 for determining the number of instances of a data object to store. The process 600 begins at step 605 where the secondary storage computing device 165 (e.g., the identifier generation component 220) generates a substantially unique identifier for the data object.

In step 610, the secondary storage computing device 165 optionally gathers (e.g., by querying the file system of a client 130) extra information (i.e., additional information) about the data object, such as its size, security information, or other attributes that the secondary storage computing device 165 may optionally use to uniquely identify the data object. At step 615 the secondary storage computing device 165 (e.g., the identifier comparison component 225) uses the generated substantially unique identifier and optionally, any extra information, to look up the data object to determine if an instance of it has already been stored on a storage device 115. The secondary storage computing device 165 may do so by querying a table or other data structure (e.g., the table 700 in the variable instancing database 205 illustrated in FIG. 7) to make this determination. At step 620 the secondary storage computing device 165 determines the number of instances of the data object that should be stored. The secondary storage computing device 165 may do so by determining the number of instances previously specified by the administrator using the interface 400 illustrated in FIG. 4A (e.g., by analyzing the storage policy).

At step 625, if an instance of the data object has already been stored, the secondary storage computing device 165 determines the number of instances of the data object that has already been stored. The secondary storage computing device 165 may do so by querying a table or other data structure (e.g., the table 700 illustrated in FIG. 7) to make this determination. At step 630, the secondary storage computing device 165 determines if the number of instances of the data object that should be stored is greater than the number of instances of the data object that are already stored. If the number that should be stored is greater than the number already stored, the process 600 branches to step 635. At step 635 the secondary storage computing device 165 determines the number of instances of the data object to store and returns the determined number of instances of the data object to store. The process 600 then continues to step 645 (discussed below). If the number of instances that should be stored is not greater than the number already stored, the process 600 branches to step 640, where the secondary storage computing device 165 returns that the number of instances of the data object to be store is equal to zero. At step 645 the secondary storage computing device 165 updates a reference count of the data object (e.g., in the table 700 illustrated in FIG. 7). The process 600 then concludes.

FIG. 10 is a flow diagram of a process 1000 for determining locations at which to store instances of data objects. The process 1000 begins at step 1010 where the secondary storage computing device 165 determines whether the locations are expressly specified in a storage policy (e.g., as expressly specified in a default storage policy or as specified by the administrator using the interface 400 illustrated in FIG. 4B). If the locations are expressly specified, the process 1000 branches to step 1060, where the secondary storage computing device 165 determines the expressly specified locations from the storage policy. The process 1000 continues at step 1050, where the secondary storage computing device 165 returns the determined locations. The process 1000 then concludes.

If the locations are not expressly specified in the storage policy, the process 1000 continues at step 1020, where the secondary storage computing device 165 determines one or more criteria to be used to select locations. The criteria can include, for example and without limitation, a storage capacity (e.g., total or available) of storage devices 115, a speed or throughput of storage operations performed using storage devices 115, an availability of storage devices 115, a time to store data on the storage devices 115, a time to access data stored on the storage devices, a power consumption of storage devices 115, etc.

Another criterion could include minimizing the risk of total data loss. For example, consider two clients 130 storing identical sets of data objects, and two separate storage devices 115. If the data of the first client 130 is variable instanced using the first storage device 115, instances of all the data objects of this data would be stored on the first storage device 115. If, at a later time, the data of the second client 130 is variable instanced using the second storage device 115, references to the data objects stored on the first storage device 115 would be stored on the second storage device 115. This would result in the first storage device 115 storing all of the actual data objects, and the second storage device 115 storing only references to the actual data objects. If the media of the first storage device 115 were to fail, this could potentially result in the loss of all the actual data objects. To reduce the risk of total data loss, the actual data objects could be stored across two or more storage devices 115, and references to data objects could be similarly distributed across the two or more storage devices 115. Then, if one storage device were to fail, it would not result in a total loss of data. Similar distribution of data objects in variable instancing storage operations can be used for purposes of load balancing and/or other purposes.

After the secondary storage computing device 165 has determined the one or more criteria, at step 1030 the secondary storage computing device 165 determines the locations that are available for storing instances of data objects. This can include one or more storage devices 115 in the system 150 and/or one or more storage devices 115 in one or more storage operation cells hierarchically or otherwise organized. At step 1035 the secondary storage computing device 165 determines the locations, from the available locations, based upon the determined one or more criteria. The process 1000 continues at step 1050, where the secondary storage computing device 165 returns the determined locations. The process 1000 then concludes.

Conventional data protection techniques and/or single instance storage techniques may have additional copies (e.g., secondary and/or tertiary copies) of data objects stored on archival media (e.g., on tape). However, such additional copies may be difficult to locate because they may not be tracked with any specificity, or in one place. Even if the additional copies of the data objects can be located on archival media, it may be time-consuming to access them due to features inherent to archival media (e.g., archival media such as tape is typically slower sequential access, in contrast with magnetic disks that allow for faster random access). In contrast to such conventional data protection techniques, the processes 500, 600 and 1000 enable an administrator to specify a variable number of instances of a data object to be stored at one or more locations (e.g., on fast-access storage devices, such as magnetic disk and/or memory, or on slow-access storage devices, such as a tape library). The locations may provide for fast access to the instances of the data object, so that, when necessary, an administrator may quickly restore an instance of the data object. Storing multiple instances (up to N−1) of N data objects provides for less risk of data loss than single instance storage techniques, and generally nearly as less risk of data loss as conventional data protection techniques. Storing multiple instances (up to N−1) of N data objects also provides for more efficient use of available storage space than conventional data protection techniques, and generally nearly as efficient use as single instance storage techniques. Accordingly, the processes 500, 600 and 1000 enable an administrator to tailor data protection to strike an appropriate balance between 1) minimizing the risk of data loss, and 2) making efficient use of available data storage space, in accordance with the administrator's requirements.

The secondary storage computing device 165 may apply various criteria and/or rules to optimize any or all of the processes 500, 600 and 1000. As previously noted, in step 610, the secondary storage computing device 165 gathers additional information about data objects (e.g., their size, security attributes, etc.). As an example of a criterion that may be applied, if the secondary storage computing device 165 determines that the size of a data object exceeds a threshold amount (e.g., one gigabyte (GB)) and the pre-specified number of instances to store of the data object exceeds a minimum number of instances, the secondary storage computing device 165 may reduce the pre-specified number of instances to the minimum number of instances (e.g., two instances). The secondary storage computing device 165 may do so in order to save available storage space on the storage devices 115. For example, a storage policy may specify that ten instances of a 2 GB file are to be stored on ten storage devices 115. Upon determining this information, the secondary storage computing device 165 may override the pre-specified number of instances (ten instances) to specify that only two instances of the 2 GB file are to be stored on two storage devices 115.

As another example of a criterion that may be applied, the secondary storage computing device 165 may maintain a count, for each data object, of a number of times that an instance of the data object has been processed by the secondary storage computing device 165. If the secondary storage computing device 165 determines that the number of times exceeds a first threshold number and the pre-specified number of instances to store of the data object does not exceed a second threshold number of instances, the secondary storage computing device 165 may increase the pre-specified number of instances to the second threshold number. For example, the secondary storage computing device 165 may encounter a file that is common to all or nearly all computing devices in a network (e.g., a file used by the operating system on each of the computing devices). Because this file is used by all or nearly all of the computing devices, it may be important, and therefore instances of it should be stored on multiple storage devices 115, in order to minimize the risk of its loss. In this case, the secondary storage computing device 165 may increase the pre-specified number of instances (e.g., two instances) to the second threshold number (e.g., ten instances) in order to store additional instances of the data object.

Similarly, if the secondary storage computing device 165 encounters fewer instances of a data object than it expects to encounter, the secondary storage computing device 163 may decrease the pre-specified number of instances (e.g., ten instances) to the second threshold number (e.g., four instances), or to the actual number of instances encountered.

As another example of a criterion that may be applied, the secondary storage computing device 165 may examine a data object's additional information (e.g., its metadata such as descriptive attributes, security information, information about a source of the data object, an owner, creator, author and/or editor of the data object, etc.) to determine a priority of the data object. If the priority of the data object exceeds a threshold priority and the pre-specified number of instances to store of the data object does not exceed a threshold number of instances, the secondary storage computing device 165 may increase the pre-specified number of instances to the threshold number. For example, the secondary storage computing device 165 may encounter files that it determines to be of high priority (e.g., files containing financial information, files containing sales information, files coming from certain workgroups within an organization, certain computing devices, certain departments within an organization, etc.). If the secondary storage computing device 165 additionally determines that the pre-specified number of instances to store of each file does not exceed a threshold number of instances, the secondary storage computing device 165 may increase the pre-specified number of instances (e.g., two instances) to the second threshold number (e.g., ten instances), in order to store additional instances of the file.

In some examples, data objects are classified according to various attributes (e.g., size, security descriptors, association with an organizational unit, etc.). As another example of a criterion that may be applied, the secondary storage computing device 165 may increase or decrease the number of instances of a data object to store based upon its classifications.

Suitable Data Structures

FIG. 7 is a diagram illustrating suitable data structures that may be employed by aspects of the invention. Such data structures may be stored in the variable instance database 205. One such data structure is, e.g., table 700, called "DataObjects." The secondary storage computing device 165 may use the table 700 to store information about data objects processed in storage operations or that are stored in secondary storage. The table 700 includes multiple rows (e.g., rows 716, 718, and 720), each of which is divided into columns in which information about a data object is stored. Column 702 stores a name of the data object, and column 704 stores the substantially unique identifier of the data object. Column 706 stores a number of instances of the data object that should be stored, and column 708 stores a number of instances of the data object that are already stored.

Column 710 stores a reference count of the number of times an instance of the data object has been processed by the secondary storage computing device 165 and/or of the number of instances already stored, column 712 stores a size of the data object, and column 714 stores a timestamp indicating when the data object was last processed by the secondary storage computing device 165, and/or when an instance was last stored. For example, row 716 contains information about the data object named "inetcom.dll" (column 702). The "inetcom.dll" data object has a substantially unique identifier of "0xA1B3FG" (column 704), two instances of it should be stored (column 706), and two instances of it have been stored (column 708). The "inetcom.dll" data object has a size in kilobytes of 258 (column 712) and the date on which it was last processed was "Nov. 1, 2008" (column 714). The table 700 may include other columns storing other information about data objects, such as information about the provenance of data objects, priority of data objects, owner of data objects, value of data objects, etc.

Another data structure that may be employed by aspects of the invention is, in one example, table 760, called "Locations." The secondary storage computing device 165 may use the table 760 to store information about locations (e.g., storage devices 115) that are available to store instances of data objects. The table 760 includes multiple rows (e.g., rows 766-774), each of which is divided into columns in which information about a location is stored. Column 762 stores a identifier of a location and column 764 stores a name of a location. For example, row 766 contains information about a location having an identifier of "00935" (column 762) and which is named "Storage Device 1" (column 764). Additionally or alternatively, paths to data (e.g., network paths, Universal Naming Convention (UNC) paths, paths identified by Uniform Resource Identifiers (URIs), etc.) may be stored in table 700. The secondary storage computing device 165 may update the table 760 as locations become available and unavailable (e.g., by adding new rows, by deleting existing rows, and/or marking as inactive existing rows), and update the location options available for selection in the interface 400 illustrated in FIG. 4B accordingly. The table 760 may include other columns storing other information about locations, such as information about their availability, their access time, their restore time, etc.

Another data structure that may be employed by aspects of the invention is, e.g., table 740, called "DataObjectsLocations." The secondary storage computing device 165 may use the table 740 to store information about associations between instances of data objects and the locations at which they are stored. The table 740 includes multiple rows (e.g., rows 746-750), each of which is divided into columns in which information about an association between a data object and a location is stored. For example, the data object named "inetcom.dll," which has the substantially unique identifier of "0xA1B3FG," is associated with locations having identifiers of "00935" and "00121" (rows 746 and 748 of table 740, respectively). These locations correspond to the locations named "Storage Device 1" and "Storage Device 2," respectively. This indicates that an instance of the "inetcom.dll" is stored at "Storage Device 1" and another instance is stored at "Storage Device 2." As another example, the data object named "Figures.pdf," which has the substantially unique identifier of "0XFG329A," is associated with location "00478" (row 750 of table 740), which corresponds to a location named "Storage Device 3." The table 740 may include other columns storing other information, such as a column that stores a unique instance identifier for each instance of the data object, thereby associating the unique instance identifier with the instance's location.

Process for Restoring a Data Object

FIG. 8 is a flow diagram of a process 800 for restoring a data object (e.g., from a storage device 115 to a client 130). The process 800 begins at step 805 where the secondary storage computing device 165 receives an indication to restore a data object. For example, an administrator may utilize an integrated management console that provides an interface for allowing the administrator to specify one or more data objects to be restored. As another example, a client 130 may request that a data object that had been previously copied be restored to it. At step 810 the secondary storage computing device 165 obtains an identifier for the data object (e.g., for a file, its file name obtained from the file system of the client 130). In step 815, the secondary storage computing device 165 gathers extra information about the data object (e.g., from index 161) that the secondary storage computing device 165 may need in order to restore the data object. This extra information may include information such as a decryption key if the data object is stored in encrypted form, a decompression routine or algorithm if the data object is stored in compressed form, and/or any other information needed to restore the data object.

At step 825 the secondary storage computing device 165 determines one or more locations (e.g., one or more storage devices 115) at which an instance of the data object is stored. The secondary storage computing device 165 may do so by querying a table or other data structure (e.g., the table 740 illustrated in FIG. 7) to determine the storage devices 115. At step 830 the secondary storage computing device 165 selects a storage device 115 from which to restore the data object. The secondary storage computing device 165 may use various criteria or factors to select a storage device 115, such as a proximity of the storage device 115 of the instance to the location (e.g., a client 130) to which it needs to be restored, an availability of each of multiple storage devices storing instances of the data object, a speed or throughput of restore operations performed using each of multiple storage devices 115, an availability of each of multiple storage devices 115, an access time of each of the multiple storage devices 115, a power consumption of each of the multiple storage devices 115, and/or other factors. Additionally or alternatively, a request to restore a data object may specify one or more locations from which to restore the data object, and/or preference criteria to use in selecting locations from which to restore data object. The secondary storage computing device 165 may use these various criteria or factors to select a "best location" or "preferred location" from which to restore the data object. At step 835 the secondary storage computing device 165 restores the data object from the selected location. At step 840 the secondary storage computing device 165 determines if there are more data objects to restore. If so, the process 800 returns to step 810. If not, the process 800 concludes.

Process for Aging Data

A storage policy may specify how long data is to be retained at specific tiers of storage or what criteria must be met before data may be moved from one tier of storage to another tier of storage. Such specifications may be cumulatively referred to as a "retention policy." A retention policy may specify how long data is to be kept on one or more tiers of storage before it can be moved to one or more other tiers of storage. For example, certain data may be subject to a retention policy that specifies that it is to be stored on a higher speed/faster access storage device 115 in secondary storage (e.g., on disk and/or in memory) for two weeks before it can be moved off the storage device 115 to a storage device in tertiary storage (e.g., to a tape library, where tape storage provides slower access but provides for less costly data storage). Such aging of data from one tier of storage to another tier may be instigated by the storage manager 105 (e.g., a monitoring agent of the storage manager 105).

As discussed herein, a storage policy may also specify that one or more instances of a data object are to be stored in secondary storage on one or more storage devices 115. Such specifications may be cumulatively referred to as a "variable instancing policy," or alternatively, as a "reduced instancing policy." If data subject to a retention policy includes data objects that are subject to a variable instancing policy, such data may not be able to be aged off of storage if such aging would result in a violation of the variable instancing policy. For example, consider an email mailbox of a user stored in secondary storage. The mailbox may contain a data object (e.g., an email attachment) that is subject to a variable instancing policy which specifies that five instances of the data object are to be stored in secondary storage across the organization implementing the variable instancing policy. Besides the instance of the data object in the mailbox, four other instances of the data object are stored in secondary storage across the organization, meaning that the variable instancing policy is satisfied. However, it also means that the mailbox cannot be aged, because to do so would result in storing a fewer number of instances of the data object (four) than is specified in the variable instancing policy (five).

One way to resolve this inability to age data containing data objects subject to a variable instancing policy (data that includes data objects is termed "containing data") would be to identify such data objects and take appropriate action on them. For example, if the only instances of the data objects are those within the containing data, the secondary storage computing device 165 could move or copy those data objects to other media (e.g., via a copy of the data objects). This would allow the secondary storage computing device 165 to then age the containing data. As another example, if the only instances of the data objects to be retained are those within the containing data to be aged off of storage, the secondary storage computing device 165 could determine when the data objects are the subject of a storage operation. In place of storing references to the existing data objects in the containing data (which would prevent the containing data from being aged, because it is referenced by other data), the secondary storage computing device 165 could instead store the additional instances of the data objects. This would allow the secondary storage computing device 165 to then age the containing data (because it is not referenced by other data). As another example, if other instances of the data objects are available in other locations, the secondary storage computing device 165 could duplicate those other instances in such a way to satisfy the variable instancing policy (e.g., by copying instances of the data objects from a storage device 115 to another storage device 115). This would allow the secondary storage computing device 165 to then age the containing data. Those of skill in the art will understand that other methods may be used to provide for storage of the appropriate number of instances of data objects.

FIG. 9 is a flow diagram of a process 900 for aging data. As previously noted, aging data refers to moving it from one tier of storage to a subsidiary tier of storage. Aging data may include converting the data from its native format to a backup or archive format, compressing the data in the backup or archive format, and storing the compressed data on slower access media (e.g., tape). The process 900 begins at step 905 where the secondary storage computing device 165 receives an indication to age data. At step 910 the secondary storage computing device 165 determines if the data contains one or more data objects that are subject to a variable instancing policy. At step 915 the secondary storage computing device 165 (e.g., the data object identification component 210) identifies a data object that is subject to a variable instancing policy. The secondary storage computing device 165 may do this by generating a substantially unique identifier for the data object and, optionally, by gathering (e.g., by querying the file system of a storage device 115) extra information (i.e., additional information) about the data object, such as its size, security information, or other attributes that the secondary storage computing device 165 may optionally use to uniquely identify the data object. The storage manager may then look up the substantially unique identifier and optionally, the extra information in an table or other data structure (e.g., in the table 700 illustrated in FIG. 7) to identify the data object. Additionally or alternatively, the secondary storage computing device 165 may identify a data object by obtaining a name of the data object (e.g., for a file, its file name obtained from the file system of the client 130) to use as the identifier of the data object.

At step 920, the secondary storage computing device 165 determines if the data object is subject to a variable instancing policy. If it is subject to a valid (i.e., still in force) variable instancing policy (meaning that the instance of the data object should be stored in order to satisfy the number of instances specified in the variable instancing policy), the process 900 continues at step 925, where the secondary storage computing device 165 determines if one or more instances of the data object are stored in locations other than the containing data. At step 930, the secondary storage computing device 165 acts on the result of the determination of step 925. If one or more instances of the data object are stored in other locations, the process continues at step 932. At step 932, the secondary storage computing device 165 copies or duplicates one of the other instances of the data object to another storage device 115. Doing so satisfies the variable instancing policy by maintaining a sufficient number of instances of the data object. The process 900 then continues at step 945. If, at step 930, the secondary storage computing device 165 determines that no instances of the data object are stored in other locations, the process continues at either step 935 or step 940.

In some examples, the secondary storage computing device 165 considers other factors in copies or duplicating instances of data objects. For example, the secondary storage computing device 165 may monitor storage devices 115 that contain variable instanced data objects (e.g., using intermittent heartbeats or other monitoring techniques). If one of the storage devices 115 fails (e.g., an associated medium fails), then the secondary storage computing device 165 can determine which data objects the storage device 115 had stored, store an additional instance of each the determined data objects on other storage devices 115, and update any references to the data objects on the failed storage device 115. The secondary storage computing device 165 thus can take proactive corrective action to ensure that a variable instancing policy is satisfied. As a further precautionary measure, the secondary storage computing device 165 can maintain one or more redundant variable instance databases 205, so that if the primary variable instance database 205 fails, the secondary storage computing device 165 still can determine the number of instances of data objects stored in secondary storage across the system 150, their locations, and other information stored in the variable instance database 205.

At step 935, the secondary storage computing device 165 copies the data object to another location (e.g., to another storage device 115). At step 940, the secondary storage computing device 165 sets a flag for the data object that the containing data cannot be aged until a storage operation is performed on another instance of the data object. Setting this flag causes the secondary storage computing device 165 to check for another instance of the data object in other storage operations that it (or another secondary storage computing device 165) performs. When the secondary storage computing device 165 (or another secondary storage computing device 165) performs another storage operation on an instance of the data object, another instance of the data object has been stored in another location (e.g., on another storage device 115). The storage manager then clears the flag set for the data object. Once all set flags for data objects have been cleared, aging the containing data will not cause the variable instancing policy to be violated for any of the data objects within the containing data. After either of steps 935 and 940, at step 945 the secondary storage computing device 165 determines if there are more data objects subject to the variable instancing policy within the containing data. If so, the process 900 returns to step 915. If not, the secondary storage computing device 165 ages the containing data. The process 900 then concludes.

CONCLUSION

From the foregoing, it will be appreciated that specific embodiments of the storage system have been described herein for purposes of illustration, but that various modifications may be made without deviating from the spirit and scope of the invention. For example, although copy operations may have been described, the system may be used to perform many types of storage operations (e.g., backup operations, restore operations, archival operations, copy operations, Continuous Data Replication (CDR) operations, recovery operations, migration operations, HSM operations, etc.). As another example, while variable instancing at the level of data objects has been described, variable instancing can also be performed at the level of data blocks (e.g., blocks of data of fixed size, such as 32 Kb, 64 Kb, 128 Kb, 256 Kb, 512 Kb, etc.). Accordingly, the invention is not limited except as by the appended claims.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

If a synchronization process or synchronization processes are described herein, it is not intended to require that multiple synchronizations occur simultaneously or that multiple computing systems being synchronized each receive the same data. Although in some examples the data can be broadcast to all participating computing systems simultaneously (or close to simultaneously), in other examples the data can be sent to different computing systems or groups of computing systems at different times. Likewise, in some examples the same data, or the same subset of the data can be sent to all computing systems. However, in other examples, subsets of the data can be tailored for a given computing system or group of computing systems.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. As another example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the inventors reserve the right to add additional claims after filing the application to pursue such additional claim forms for other aspects of the invention.

We claim:

1. A method in a data storage system of storing a variable number of instances of data objects, wherein the method is performed by a computing system having a processor and memory, the method comprising:
   accessing a set of data objects stored in a first set of one or more data stores,
      wherein the set of data objects includes multiple data objects that are substantially similar, and
      wherein the multiple data objects that are substantially similar includes a number N data objects;
   analyzing a storage policy;
   determining, by the computing system, a number X of instances of a first data object of the multiple data objects that are substantially similar that should be stored in a second set of one or more data stores,
      wherein determining the number X of instances of the first data object is based on the storage policy;
      wherein X is greater than one and less than N and N is greater than two, and
      wherein the first and second sets of data stores are distinct from each other;
   adjusting the number X of instances of the first data object, wherein adjusting the number X includes:
      determining a characteristic or priority of the first data object, wherein the characteristic or priority is based on at least two of:
         an owner of the first data object;
         a content of the first data object;
         an association of the first data object with an organization unit;
         a security descriptor of the first data object; and
         the number N of data objects included in multiple data objects; and
      based at least in part on the determined characteristic or priority of the first data object, increasing or decreasing the number X of instances of the first data object of the multiple data objects that should be stored in the second set of one or more data stores;
   determining a number Y of instances of the first data object that are stored in the second set of one or more data stores,
      wherein Y is greater than or equal to zero;
   determining if the adjusted number X is greater than Y; and
   when the adjusted number X is greater than Y, storing a number Z of instances of the first data object in the second set of one or more data stores,
      wherein Z is equal to the adjusted number X minus Y.

2. The method of claim 1 wherein determining the number Y includes:
   generating a substantially unique identifier for the first data object;
   analyzing a data structure; and
   based at least in part on the analyzing of the data structure, determining the number Y of instances of the first data object that are stored in the second set of one or more data stores.

3. The method of claim 1, further comprising:
   receiving an indication to perform a storage operation on the set of data objects; and
   performing the storage operation on the set of data objects, wherein performing the storage operation includes copying Z instances of the first data object to the second set of one or more data stores.

4. The method of claim 1, further comprising determining the second set of one or more data stores based at least in part upon one or more characteristics of at least one data store in the second set, wherein the one or more characteristics include at least one of:
   a storage capacity of the at least one data store;
   a power consumption of the at least one data store;
   a time to store data on the at least one data store; and
   a time to access data stored on the at least one data store.

5. The method of claim 1, further comprising:
   monitoring the multiple data objects;
   determining when the number N of data objects included in the multiple data objects exceeds a predetermined threshold; and
   when the number N of data objects exceeds the predetermined threshold storing at least one instance of the first data object in the second set of data stores.

6. A system for storing multiple instances of a data object in a data storage network, wherein the data storage network includes multiple data storage devices coupled via a computer network, and wherein the computer network also couples to one or more computing devices storing a first set of N number of substantially similar data objects, the system comprising:
   multiple data storage devices storing a second set of data objects,
      wherein at least one of the multiple data storage devices is embodied in hardware, and
      wherein the multiple data storage devices are distinct from, and coupled via the computer network to, the one or more computing devices;
   a variable instance database configured to store information associated with the second set of data objects,
      wherein the information includes, for each of the data objects of the second set:
         a substantially unique identifier for the data object, and
         a number of instances of the data object in the second set of data objects,
            wherein at least one of the data objects of the second set has multiple instances in the second set of data objects;
   a secondary storage computing device configured to:
      receive an indication to perform a storage operation on the first set of N number of substantially similar data objects,
         wherein N is a number greater than 3,
      determine a substantially unique identifier for each of the N number of substantially similar data objects of the first set;
      search for the substantially unique identifier in the variable instance database;
      determine a number of instances of the N number of substantially similar data objects to store in the second set of data objects based on the received indication to perform the storage operation,
         wherein the determined number is more than one and less than all of the N number substantially similar data objects;
      adjust the number of instances of the N number of substantially similar data objects based on a characteristic or priority of the N number of substantially similar data objects,
         wherein the characteristic or priority includes at least two of:
            an owner of the N number of substantially similar data objects;
            a content of the N number of substantially similar data objects;

an association of the N number of substantially similar data objects with an organization unit;
a security descriptor of the N number of substantially similar data objects; and
store the adjusted number of instances of the N number of substantially similar data objects in the second set of data objects.

7. The system of claim 6 wherein the one or more computing devices storing a first set of N number of substantially similar data objects are at a first hierarchical tier of the data storage network and the multiple data storage devices are at a second hierarchical tier of the data storage network.

8. The system of claim 6, further comprising a storage manager component configured to:
receive an indication to perform the storage operation on the N number of substantially similar data objects of the first set; and
send the indication to the secondary storage computing device.

9. The system of claim 6, further comprising:
a first storage manager component configured to:
receive an indication to perform the storage operation on the N number of data objects of the first set; and
send the indication to the secondary storage computing device; and
a second storage manager component configured to:
receive the indication to perform the storage operation on the N number of data objects of the first set; and
send the indication to the first storage manager component,
wherein the first storage manager component is hierarchically subordinate to the second storage manager component in the data storage network.

10. The system of claim 6, further comprising an indexing component configured to:
generate index data based at least partially upon the N number of data objects of the first set; and
store the generated index data in an index.

11. The system of claim 6 wherein the secondary storage computing device is further configured to generate the substantially unique identifier for each of the N number of substantially similar data objects of the first set.

12. The system of claim 6 wherein the substantially unique identifier for each of the N number of substantially similar data objects of the first set is generated by the one or more computing devices.

13. A method in a computing system of storing multiple instances of substantially similar data objects, wherein the method is performed by a computing system having a processor and memory, the method comprising:
receiving an indication, based on a storage policy, to perform a storage operation on a first set of data stored by one or more computing devices,
wherein the first set of data corresponds to a first tier of data storage for primary data,
wherein the first tier of data storage comprises disk media; and
for at least a first data object in the first set of data:
determining a priority of the first data object,
wherein the priority of the first data object is based on at least two of:
an owner of the first data object;
a content of the first data object;
an association of the first data object with an organization unit;
a security descriptor of the first data object;
determining, by the computing system, a first number of instances of the first data object that should be stored in a second set of data distinct from the first set of data,
wherein the first number is greater than one,
wherein the second set of data corresponds to a second tier of data storage for secondary data,
wherein the second tier of data storage comprises tape media,
wherein the first set of data is aged off of the first tier of data storage to the second tier of data storage, and
wherein the determined number that should be stored is based on the storage policy;
adjusting the first number of instances based on the priority of the first data object after said determining the first number of instances of the first data object;
generating a substantially unique identifier that represents the first data object;
based on the generated substantially unique identifier, determining a second number of instances of the first data object already stored in the second set of data; and
when the adjusted first number is greater than the second number, storing a third number of instances of the first data object in the second set of data,
wherein the third number is equal to the difference between the adjusted first number and the second number.

14. The method of claim 13 wherein the second set of data is stored on one or more storage devices, and wherein the method further comprises determining at least one storage device on which to store the at least one instance of the first data object, wherein storing the at least one instance of the first data object in the second set of data includes storing the at least one instance of the first data object on the at least one storage device.

15. The method of claim 13 wherein the second set of data is stored on one or more storage devices, and wherein the method further comprises determining at least one storage device on which to store the at least one instance of the first data object based upon one or more criteria, wherein the criteria include at least two of:
a power consumption of the at least one storage device;
a storage capacity of the at least one storage device;
a throughput of storage operations performed using the at least one storage device;
an availability of the at least one storage device; and
an access time for data stored on the at least one storage device.

16. The method of claim 13, further comprising, for at least the first data object in the first set of data:
determining a size of the first data object;
determining if the size of the first data object exceeds a threshold amount; and
if the size of the first data object exceeds the threshold amount, then decreasing the first number of instances of the first data object that should be stored in the second set of data.

17. The method of claim 13, further comprising, for at least the first data object in the first set of data:
determining a fourth number of instances of the first data object in the first set of data;

determining if the fourth number of instances of the first data object in the first set of data exceeds a threshold number; and when the fourth number of instances of the first data object in the first set of data exceeds the threshold number, then storing at least one additional instance of the first data object in the second set of data.

18. The method of claim 13, further comprising, for at least the first data object in the first set of data:

determining if the priority of the first data object exceeds a predetermined priority; and when the priority of the first data object exceeds the predetermined priority, then storing at least one additional instance of the first data object in the second set of data.

* * * * *

UNITED STATES PATENT AND TRADEMARK OFFICE
CERTIFICATE OF CORRECTION

PATENT NO. : 8,401,996 B2
APPLICATION NO. : 12/649454
DATED : March 19, 2013
INVENTOR(S) : Marcus S. Muller et al.

It is certified that error appears in the above-identified patent and that said Letters Patent is hereby corrected as shown below:

In the Specification

In column 6, line 27, Delete "storage devices" and insert -- and storage devices --, therefor.

Signed and Sealed this
Eighteenth Day of June, 2013

Teresa Stanek Rea
*Acting Director of the United States Patent and Trademark Office*